April 11, 1967 C. E. DRAKE ET AL 3,313,185
AUTOMATIC GRINDERS
Filed Oct. 29, 1962 13 Sheets-Sheet 1

INVENTOR.
CLAUD E. DRAKE
ADOLPH H. KLEINSORGE
BY
ATTORNEY

INVENTOR.
CLAUD E. DRAKE
ADOLPH H. KLEINSORGE
BY
Alfred W Petchaft
ATTORNEY

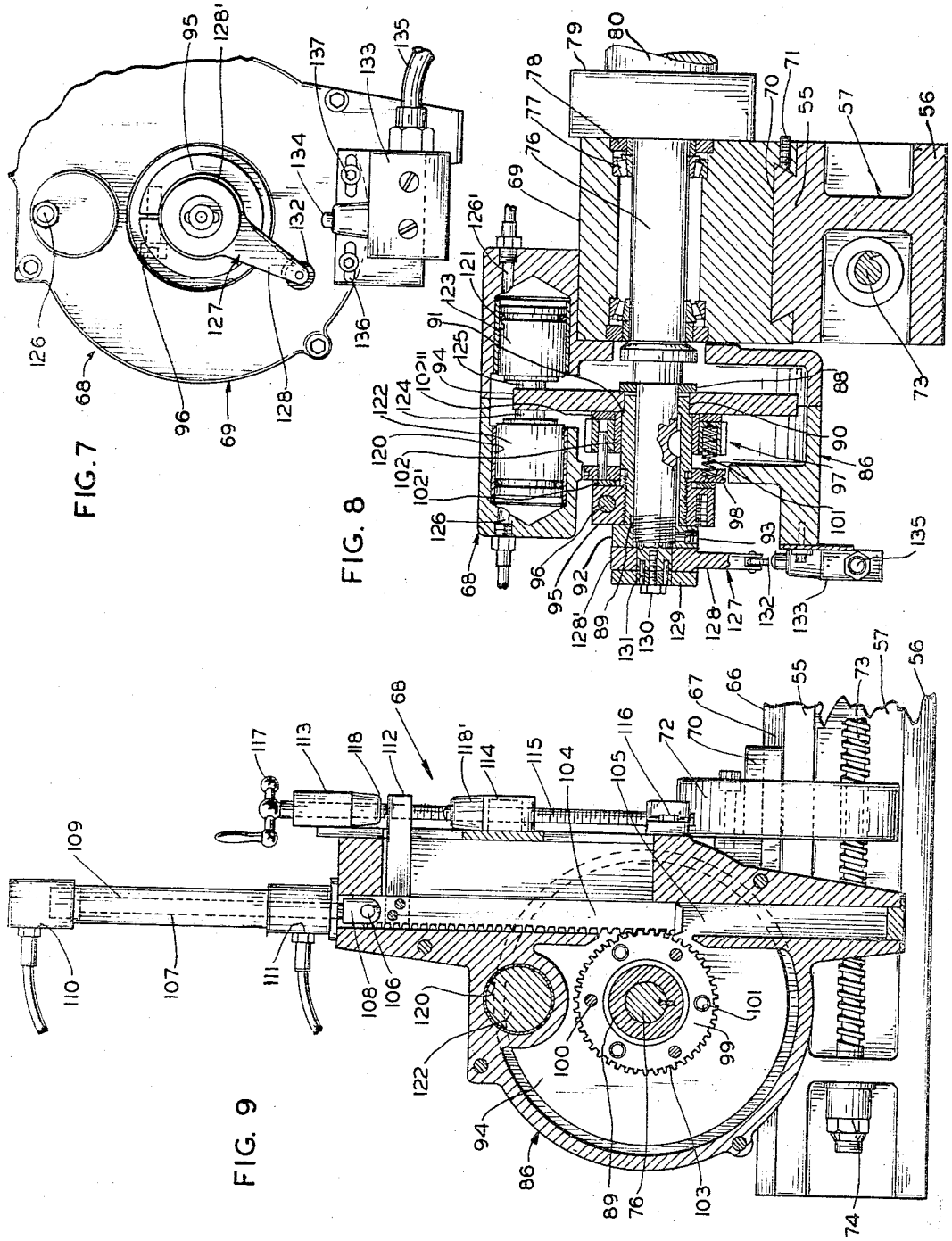

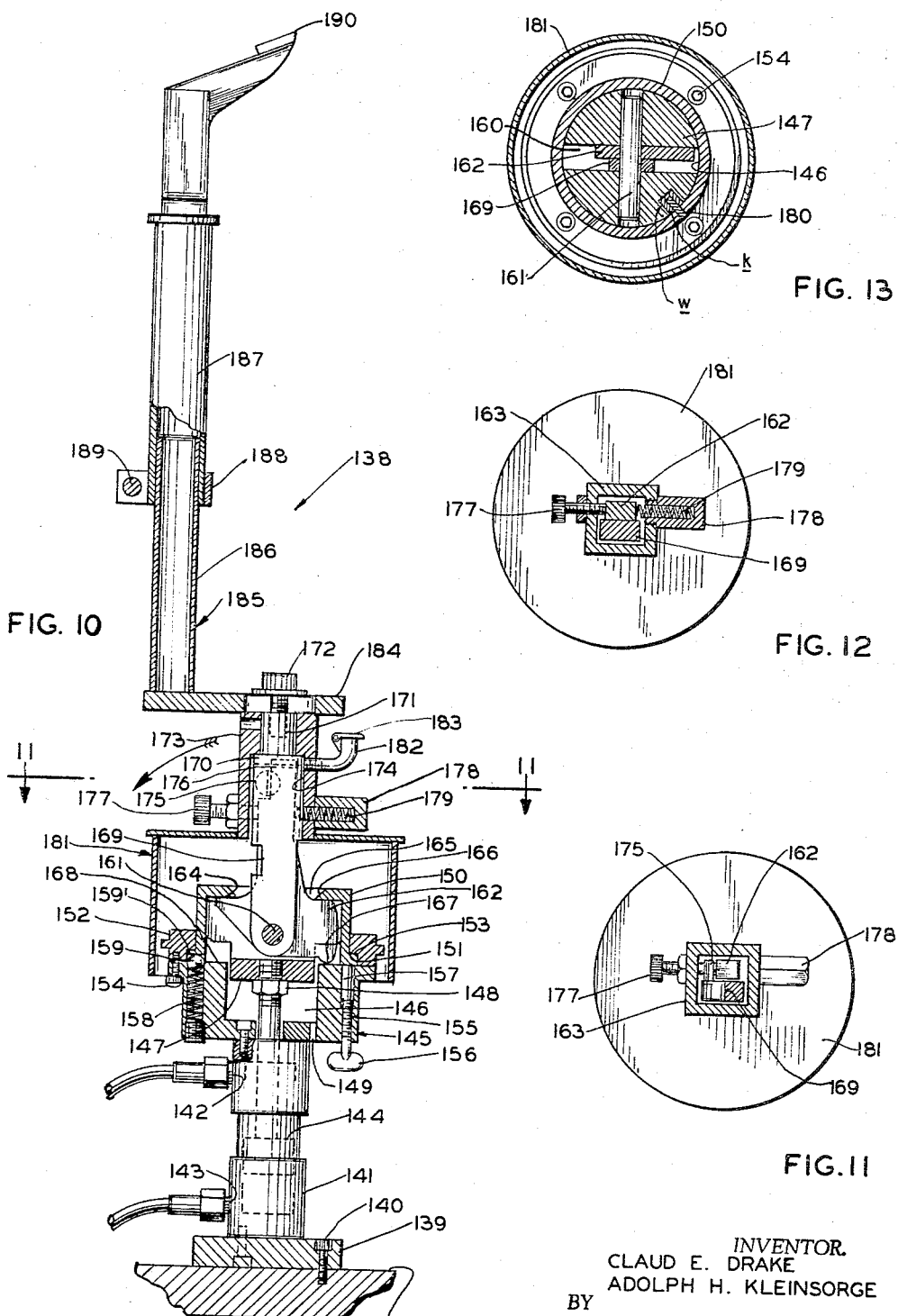

April 11, 1967  C. E. DRAKE ET AL  3,313,185
AUTOMATIC GRINDERS

Filed Oct. 29, 1962  13 Sheets-Sheet 7

INVENTOR.
CLAUD E. DRAKE
ADOLPH H. KLEINSORGE
BY
Alfred W. Petchaft
ATTORNEY

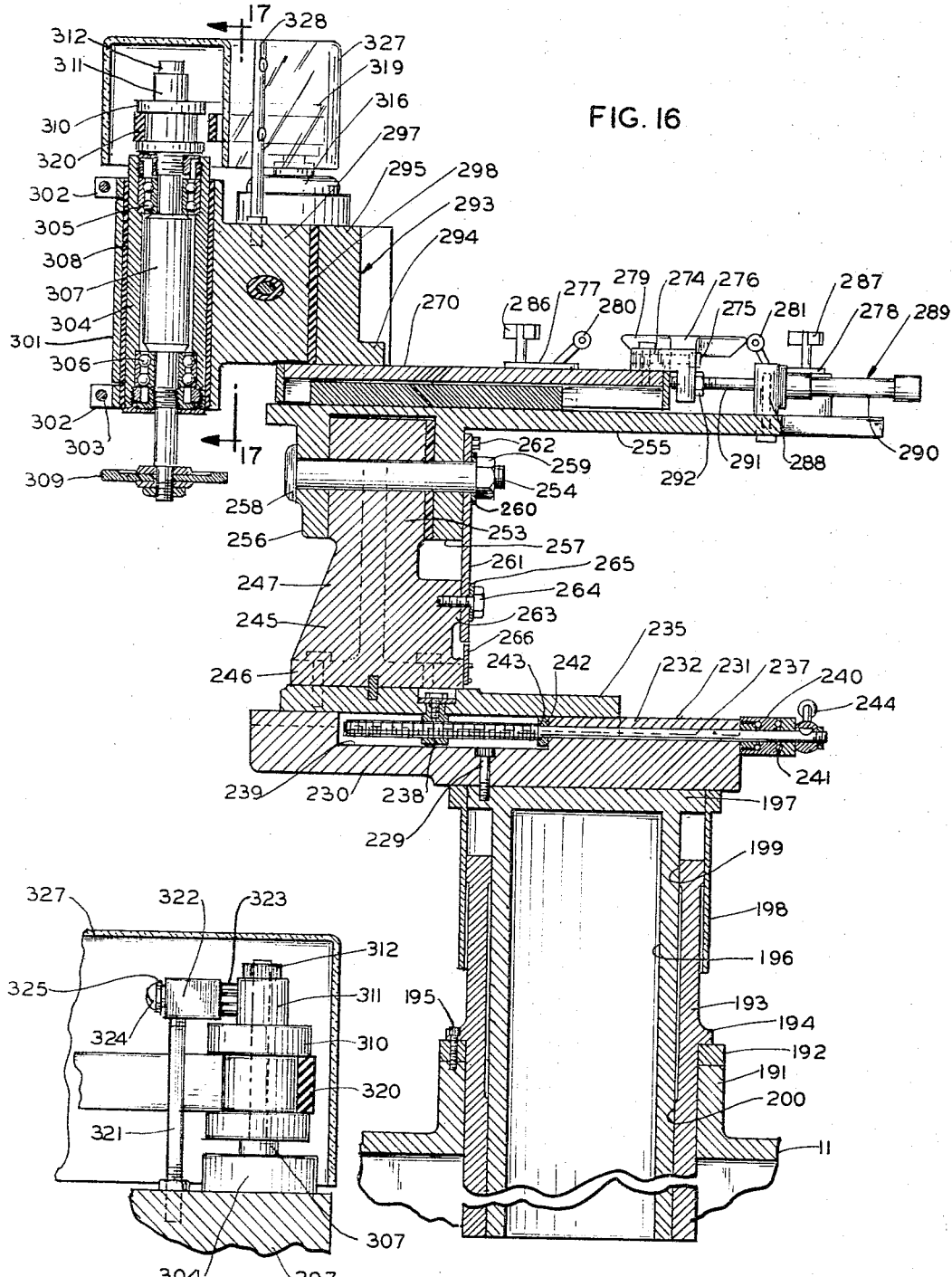

April 11, 1967

C. E. DRAKE ET AL 3,313,185

AUTOMATIC GRINDERS

Filed Oct. 29, 1962

INVENTOR.
CLAUD E. DRAKE
ADOLPH H. KLEINSORGE
BY

*Alfred W Petchaft*

ATTORNEY

INVENTOR.
CLAUD E. DRAKE
ADOLPH H. KLEINSORGE
BY
Alfred W. Petchaft
ATTORNEY

April 11, 1967 C. E. DRAKE ET AL 3,313,185
AUTOMATIC GRINDERS
Filed Oct. 29, 1962 13 Sheets-Sheet 11

INVENTOR.
CLAUD E. DRAKE
ADOLPH H. KLEINSORGE
BY
ATTORNEY

April 11, 1967

C. E. DRAKE ET AL 3,313,185

AUTOMATIC GRINDERS

Filed Oct. 29, 1962

INVENTOR.
CLAUD E. DRAKE
ADOLPH H. KLEINSORGE
BY
Alfred W Petchaft
ATTORNEY

United States Patent Office 3,313,185
Patented Apr. 11, 1967

3,313,185
AUTOMATIC GRINDERS
Claud E. Drake, Brentwood, and Adolph H. Kleinsorge, St. Louis County, Mo., assignors to Drake Corporation, St. Louis, Mo., a corporation of Missouri
Filed Oct. 29, 1962, Ser. No. 233,554
26 Claims. (Cl. 76—43)

This invention relates in general to certain new and useful improvements in grinding devices and, more particularly, to an automatic grinding device for sharpening circular cutters, such as carbide tipped circular saws, and the like.

At the present time, circular cutters of the type above-mentioned are sharpened by a series of successive manual grinding operations. In many cases, various jigs, fixtures, and accessory tools may be used, but a certain amount of set-up work must be done by the individual mechanic for each tooth. Thus, after one tooth is sharpened, the operator will manually set up the next tooth in position for grinding and manually feed the grinding wheel across the saw blade. Moreover, as a considerable part of the grinding operation is manually performed, the operator, doing the sharpening of the saw blade, must exercise continual care that each tooth of the saw blade is ground to the same degree.

It is, therefore, the primary object of the present invention to provide a saw grinder which is fully automatic in its operation.

It is another object of the present invention to provide a saw grinder of the type stated which is relativley simple, inexpensive in construction and maintenance and is capable of performing highly accurate and precise grinding operations.

It is a further object of the present invention to provide a saw grinder of the type stated which is readily adapted for accommodating a wide range of various sizes and shapes of saw blades.

It is an additional object of the present invention to provide a saw grinder of the type stated which can be manually or automatically operated as desired.

With the above and other objects in view, our invention resides in the novel features of form, construction, arrangement, and combination of parts presently described and pointed out in the claims.

In the accompanying drawings (thirteen sheets)

Figure 2:
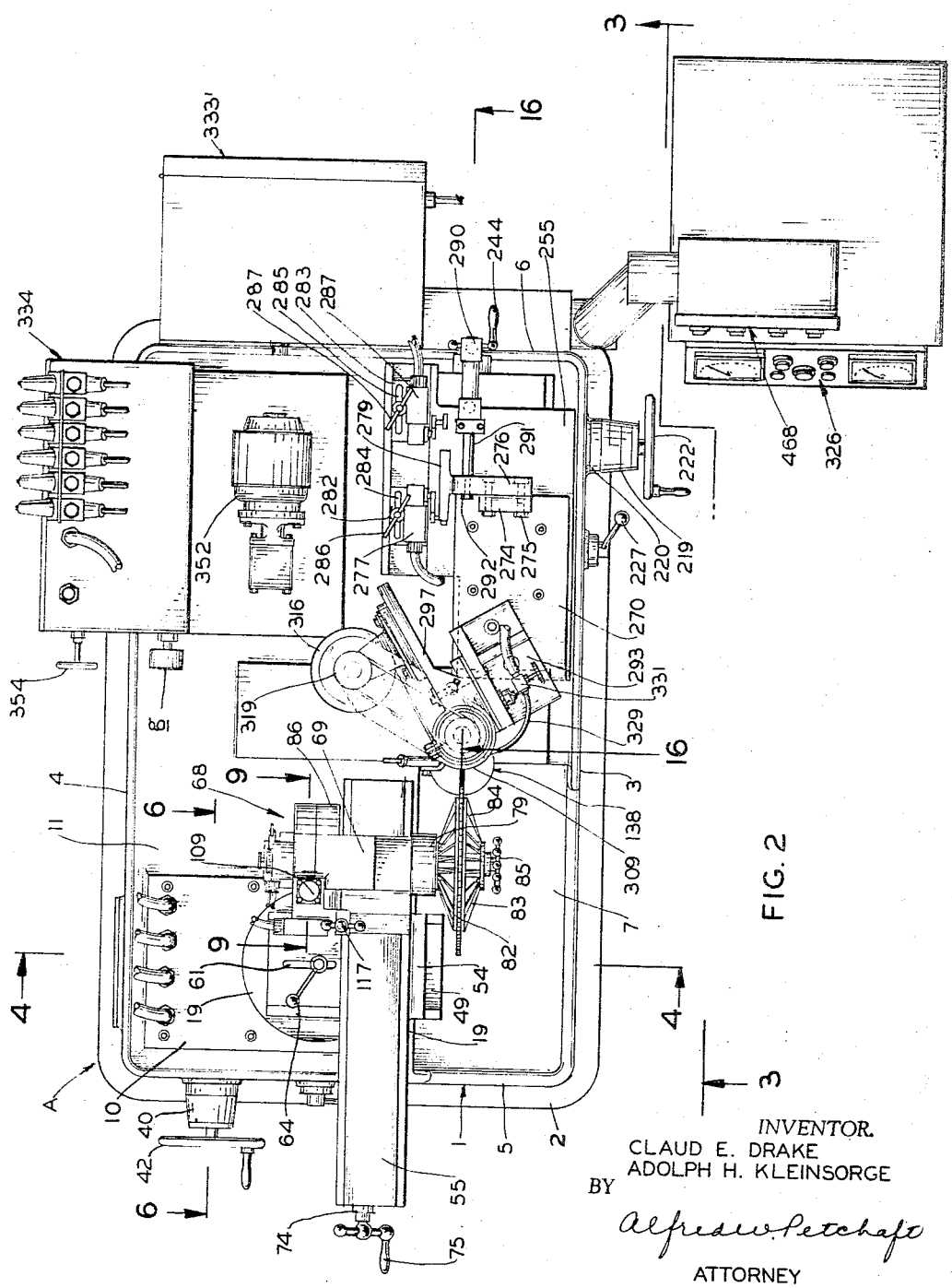
FIG. 2 is a top plan view of the automatic saw grinder constructed in accordance with and embodying the present invention.
Figure 3:
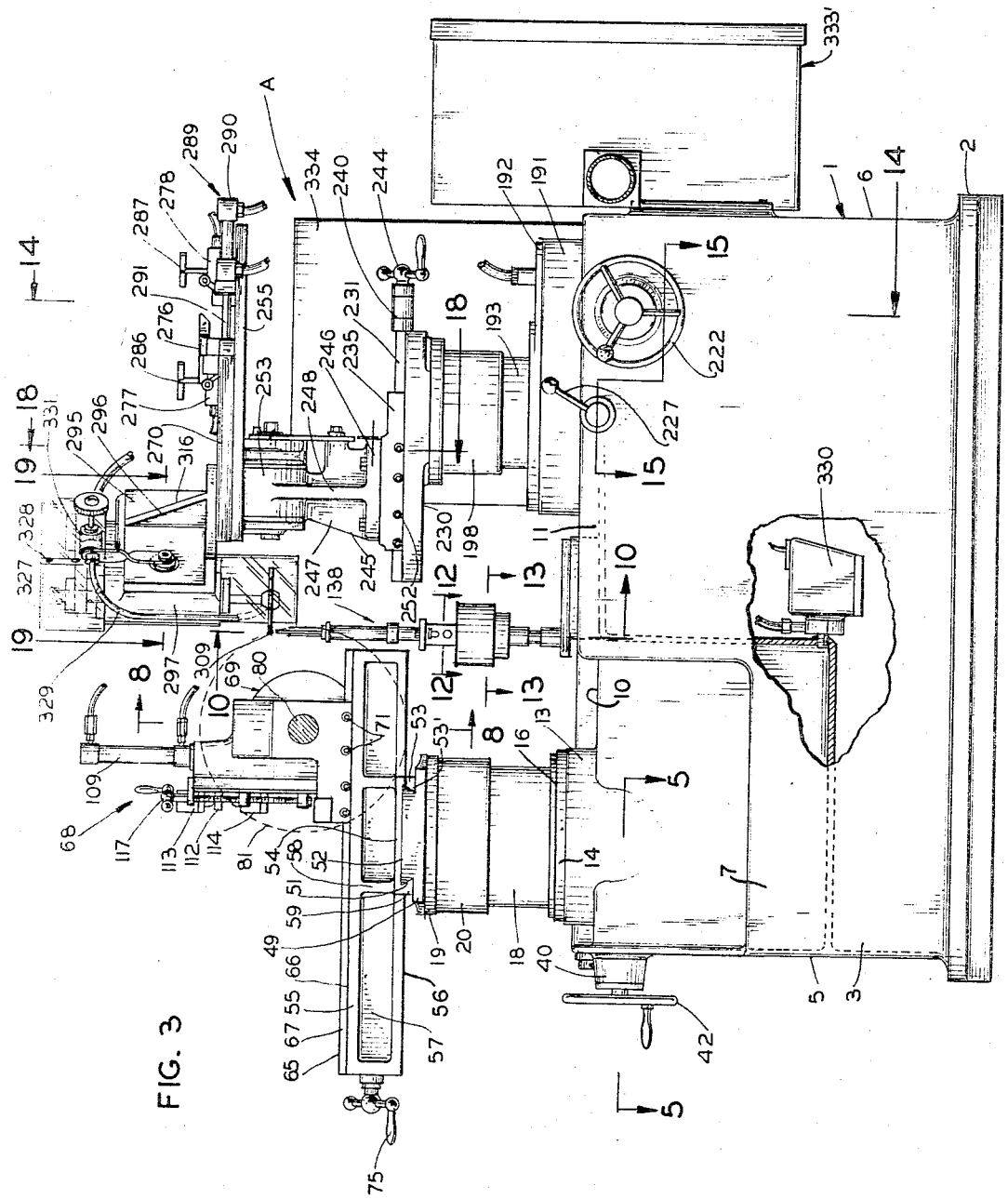
Figure 4:
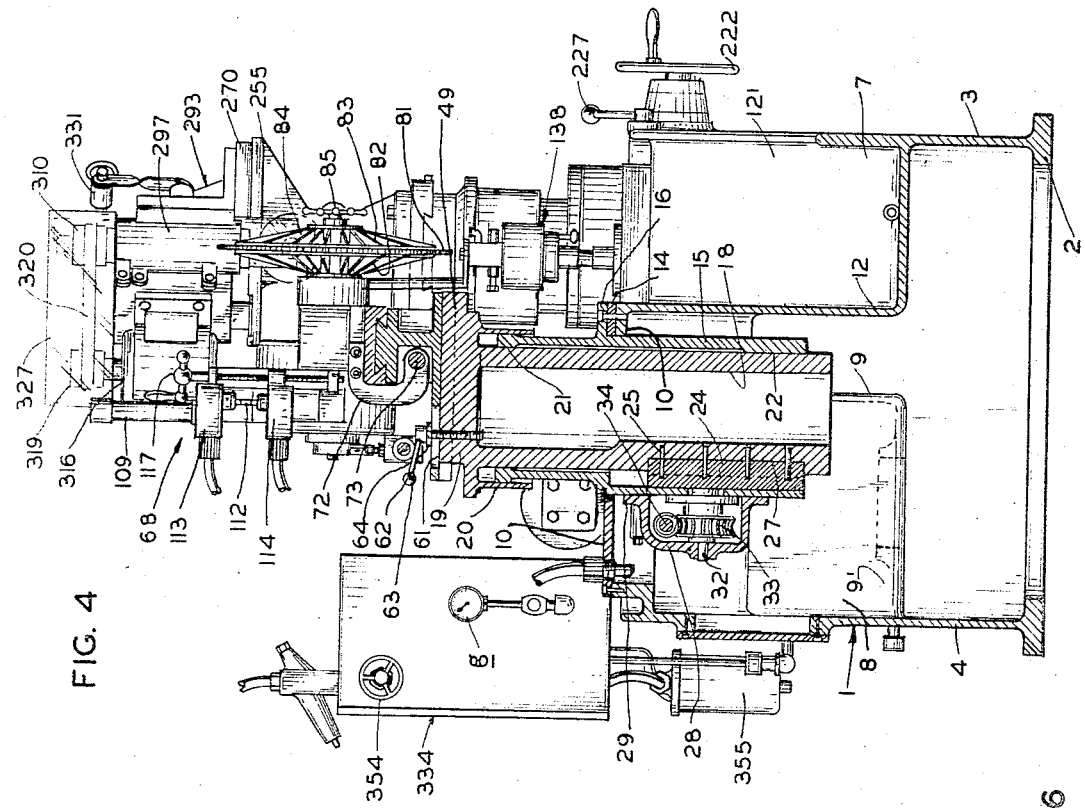
Figure 5:
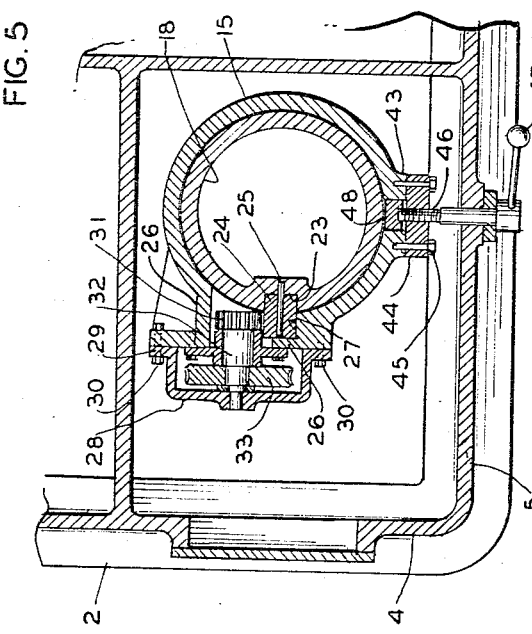
Figure 6:
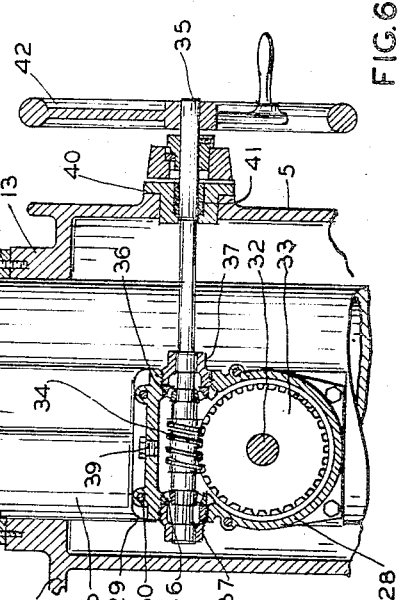
Figure 14:
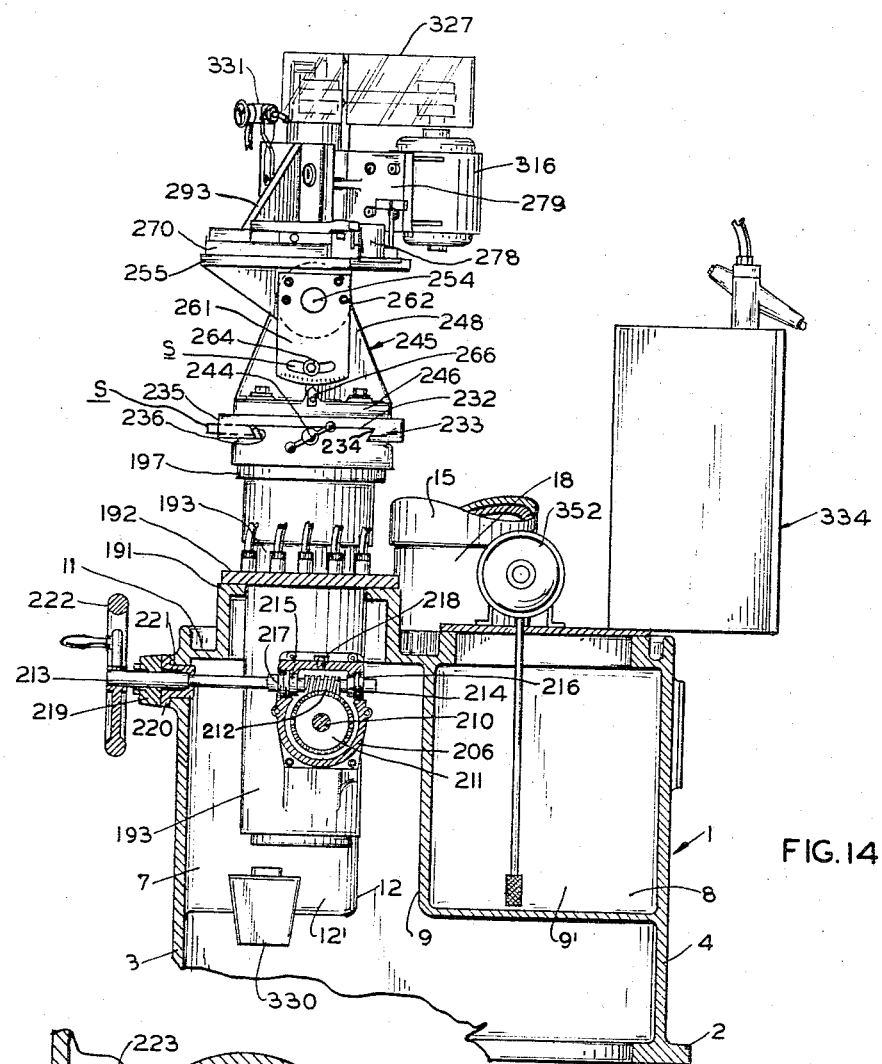
Figure 15:
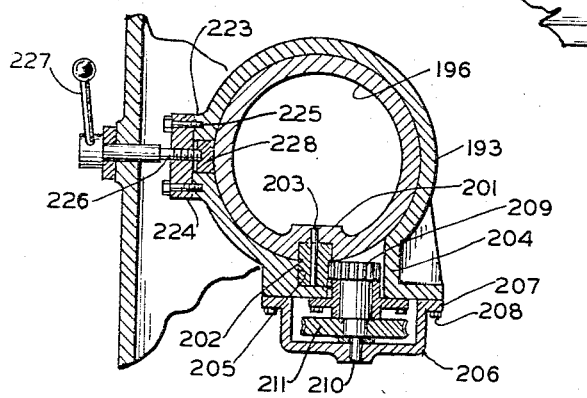
Figure 18:
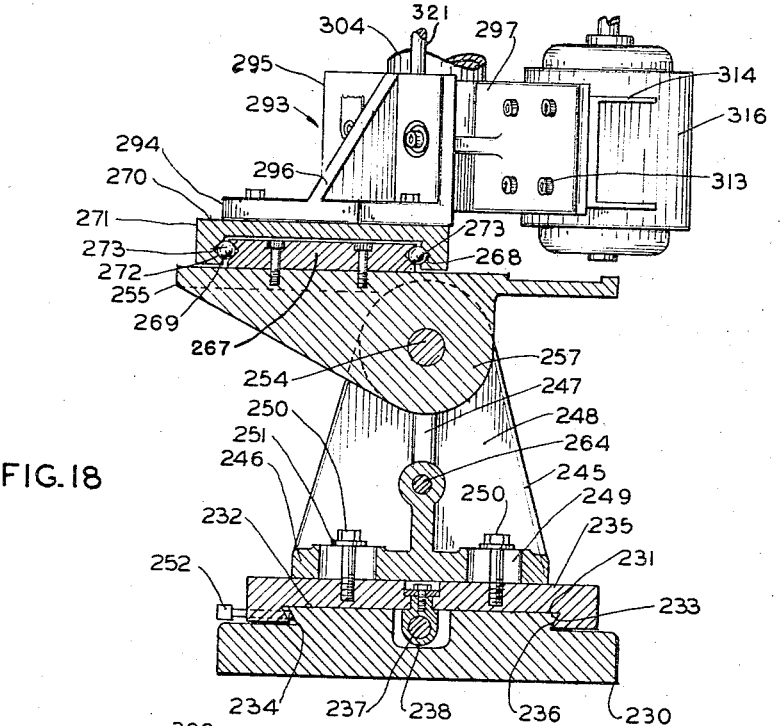
Figure 19:
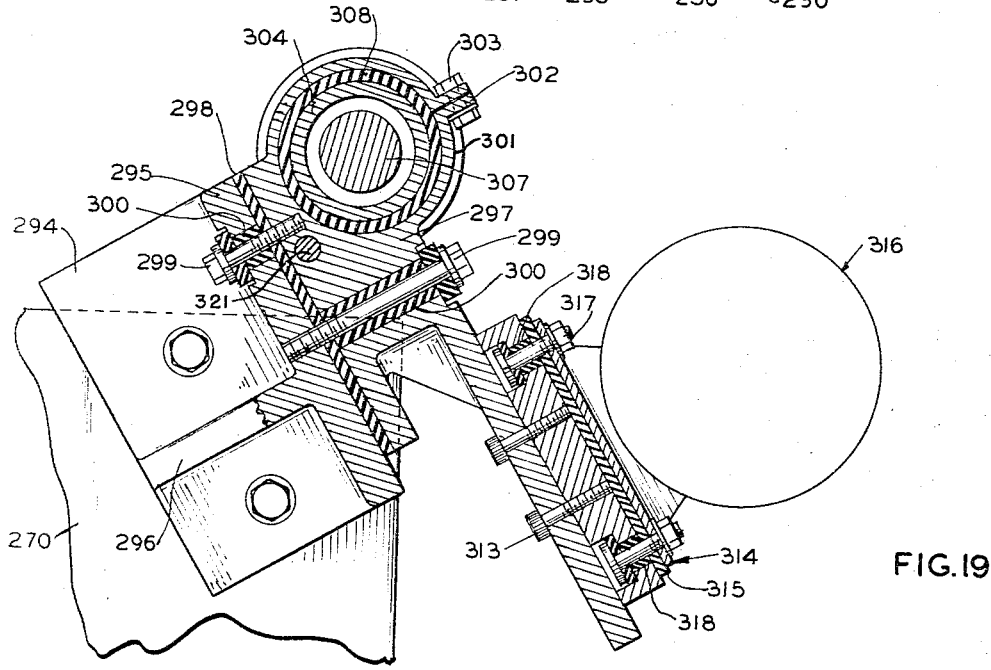

FIGS. 3 and 4 are vertical sectional views taken along lines 3—3 and 4—4, respectively, of FIG. 2;

FIG. 5 is a fragmentary sectional view taken along line 5—5 of FIG. 3;

FIG. 6 is a fragmentary sectional view taken along line 6—6 of FIG. 2;

FIG. 7 is a side elevational view of a tooth advancing mechanism forming part of the present invention;

FIG. 8 is a fragmentary sectional view taken along line 8—8 of FIG. 3;

FIG. 9 is a fragmentary sectional view taken along line 9—9 of FIG. 2;

FIG. 10 is a fragmentary sectional view of an indexing device forming part of the present invention taken along line 10—10 of FIG. 3;

FIG. 11 is a sectional view taken along line 11—11 of FIG. 10;

FIG. 12 is a sectional view taken along line 12—12 of FIG. 3;

FIG. 13 is a sectional view taken along line 13—13 of FIG. 3;

FIG. 14 is a fragmentary sectional view taken along line 14—14 of FIG. 3;

FIG. 15 is a fragmentary sectional view taken along line 15—15 of FIG. 3;

FIG. 16 is a fragmentary sectional view taken along line 16—16 of FIG. 2;

FIG. 17 is a fragmentary sectional view taken along line 17—17 of FIG. 16;

FIG. 18 is a fragmentary sectional view taken along line 18—18 of FIG. 3;

FIG. 19 is a fragmentary sectional view taken along line 19—19 of FIG. 3; and

FIGS. 20a, 20b, 20c, and 20d, are interrelated figures and taken together constitute the control system of the present invention.

Generally speaking, the present invention includes a base member which supports a mounting device for holding a circular saw blade which is to be ground, a grinding device including a grinding wheel, and an indexing device for positioning each tooth of the saw blade with respect to the grinding wheel.

The mounting device includes means for shifting the circular saw blade vertically with respect to the grinding wheel, and longitudinally with respect to the grinding wheel. Additional means are operatively associated with the last-named means so that the saw can be shifted laterally with respect to the grinding wheel. The various adjustments make it possible to accommodate circular saws of various sizes, diameters, thicknesses, and configuration of teeth.

The grinding means is also mounted so that it can be shifted vertically and longitudinally with respect to the circular saw. Moreover, the grinding means is mounted so that it can be tilted at an angle with respect to the teeth on the circular saw for sharpening teeth of various pitch. Included within the grinder of the present invention is means for providing electrical assist for the removal of material from the work.

Also mounted upon the base is indexing means which will successively and automatically position each tooth of the circular saw in alignment with the grinding wheel during the grinding operation. After one tooth of the saw blade has been ground, such means will rotate the saw blade until the next adjacent tooth is in alignment for grinding.

A power means is provided for operating each of the three above-mentioned components in pre-timed relationship to each other. When the ratchet saw shifting means rotates the circular saw, the indexing means will operate in pre-timed relationship and position the next adjacent tooth in alignment with the grinding wheel. Simultaneously with the positioning operation, the grinding wheel will be retracted to permit the rotation of the blade and after the rotation and positioning is completed, the grinding wheel will be returned to its cutting position. This control system includes the necessary adjustments to accommodate practically all types and sizes of circular saws.

Referring now in more detail and by reference characters to the drawings, which illustrate a preferred embodiment of the present invention, A designates an automatic saw grinder generally comprising a base 1, having a bottom rim 2 integrally formed with a front wall 3 and a back wall 4 which are interconnected at their transverse margins by end walls 5, 6. The base 1 is preferably a heavy casting and is internally subdivided into an upwardly opening coolant reservoir 7 and an oil reservoir 8, the latter of which includes a pair of vertical side walls 9, 9′, and a top wall 10. Extending across a portion of the upper end of the front and back walls 3, 4, is a top wall 11. The coolant reservoir 7 is formed by a pair of vertical walls 12, 12'. It should be noted that the top wall 10 and the top wall 11 are slanted slightly so that any liquid coolant which accumulates thereon will drain into the coolant reservoir 7.

The top wall 10 is integrally formed with an upstanding pedestal-like support element or open-ended boss 13 and mounted on the upper end thereof is a horizontal cover plate 14, which is suitably apertured to accommodate a vertical cylindrical guide sleeve 15, the latter being integrally formed with an outwardly extending annular flange 16 for bolting to the boss 13 by means of bolts 17. Disposed within the guide sleeve 15 for vertical shifting movement therein is an elevating column 18 which is integrally formed with a diametrically enlarged top plate 19, the latter of which integrally merges into a depending guide flange 20 and which engages the outer annular surface of the guide sleeve 15. By reference to FIG. 4, it can be seen that the guide sleeve 15 is formed with a reduced thickness intermediate its upper and lower ends, providing an upper annular bearing surface 21 and a lower annular bearing surface 22. By means of this construction, the elevating column 18 is capable of shifting vertically within the guide sleeve 15 with reduced bearing surface, and hence less friction. The elevating column 18 is provided with a relatively flat surface 23 on a portion of its periphery for suitably mounting a vertical rack bar 24 by means of bolts 25. The guide sleeve 15 is integrally formed at its lower end with a pair of outwardly extending flanges 26, one of which is vertically grooved to form a keyway 27 for accommodating the rack bar 24. Thus, it can be seen that as the rack bar 24 is vertically shiftable within the keyway 27, the elevating column 18 will be retarded from rotative movement about its central axis. Bolted to the outwardly extending flanges 26 is a gear housing 28 having an annular flange 29 for accommodating bolts 30. The rack bar 24 meshes with a pinion gear 31 which is mounted on a shaft 32, the latter being journaled with the end wall of the housing 28. Rigidly secured to and rotatable with the shaft 32 is a worm-wheel 33 which meshes with a worm 34, the latter being suitably mounted upon an outwardly extending shaft 35. The housing 28 is suitably grooved to accommodate a set of axially aligned radial and thrust bearings 36 for journaling the shaft 35, and which are retained by means of retaining collars 37, threadedly mounted within the housing 28 and held by set screws. The housing 28 can be preferably provided with a filler plug 39 which is removable in order to inject lubricating oil within the housing 28 for lubricating the various moving parts. The shaft 35 extends outwardly of the end wall 5 through a bearing cap 40 which is secured to the end wall 5 and is journaled in bearings 41, the latter being suitably mounted within the bearing cap 40. Keyed to, or otherwise rigidly secured to, the outer end of the shaft 35 is a crank handle 42 for conveniently turning the shaft 35. Thus, when the shaft 35 is turned by the crank handle 42, it will rotate the worm 34 which will, in turn, rotate the worm-wheel 33. As the worm-wheel 33 rotates, it will, in turn, rotate the shaft 32, causing the pinion gear 31 to raise or lower the rack bar 24. As the elevating column 18 is secured to the rack bar 24, it will raise and lower therewith.

By means of the above-outlined construction, it can be seen that the vertical position of the elevating column 18 is maintained by rotating the crank handle 42. It should be noted that a force applied to the top plate 19 of the elevating column 18 will not force the same downwardly by back rotation of the various gears and worms. Because of the comparative size of the worm-wheel 33 and the worm 34, a much greater force is necessary to rotate the worm 34 through the shaft 32 than it is to rotate the worm 34 through the shaft 35. However, in order to maintain the elevating column 18 in a rigidly locked position, the guide sleeve 15 is axially slit and formed with a pair of outwardly extending spaced parallel flanges 43 which are connected by a cross-bar 44 suitably secured to the flanges 43 by means of bolts 45. A locking bolt 46, which suitably terminates outwardly of the end wall 5 in an enlarged handle 47, is threadedly mounted within the cross-bar 44 and bears against a shoe 48, the latter of which, in turn, bears against the angular surface of the elevating column 18. Thus, by turning the handle 47 in a direction to thread the locking bolt 46 within the cross-bar 44, the locking bolt 46 will bear against the shoe 48, which will, in turn, bear against the annular surface of the elevating column 18, holding the column 18 in a locked position.

The top plate 19 of the elevating column 18 is integrally formed with an offset head 49. Disposed upon the upper surface of the offset head 49 is a guide block 51 having an enlarged head 52 formed with downwardly converging side walls 53, the latter of which form laterally extending guide slots 53'. Slidably mounted on the enlarged head 52 is a laterally shiftable slide 54 having upper and lower horizontal plates 55, 56, connected by a vertical web 57, the plates 55, 56, further being reinforced by a set of laterally extending gusset plates 58. Integrally formed with the underside of the lower plate 56 is a pair of depending laterally extending guide fingers 59 which engage the downwardly converging side walls 53 and, therefore, guide the slide 54 along its lateral shiftable movement on the enlarged head 52. The lower horizontal plate 56 is provided with an elongated slot 61 for accommodating a large bolt 62, the latter being threadedly secured to the top plate 19. Thus, it can be seen that the lateral movement of the slide 54 is limited by the length of the slot 61. Interposed between the upper surface of the lower horizontal plate 56 at the head of the bolt 62 is a washer 63 which is diametrically larger than the size of the elongated slot 61. The enlarged bolt 62 is provided with an outwardly extending handle 64, for threadedly locking the bolt 62 within the top plate 19. Thus, when it is desired to lock the slide 54 in any of a plurality of horizontally shiftable positions, the handle 64 is turned, locking the bolt 62 within the top plate 19, and at the same time forcing the washer 63 against the upper surface of the lower plate 56, thereby locking the slide 54 in a rigid position.

The upper horizontal plate 55 is integrally formed with an upstanding guide block 65 having a pair of converging side walls 66, forming longitudinally extending guide channels 67. Slidably mounted on the guide block 65 for longitudinal shifting movement is a saw blade advancing mechanism 68 which includes a cast metal housing 68 having a dovetail groove 70 on its underside for engagement with the guide channels 67, thereby permitting the saw blade advancing mechanism 68 to shift longitudinally on the laterally shiftable slide 54. A plurality of spaced set screws 71 are mounted within the side of the housing 69 for rigidly securing the housing 69 to the guide block 65 in any of the plurality of longitudinally shiftable positions. Bolted or otherwise rigidly secured to the left transverse end of the housing 69 (reference being made to FIG. 3), is a U-shaped link 72 which is also threadedly mounted on a jack shaft 73, the latter being journaled within each of the transverse ends of the laterally shiftable slide 54 and retained by means of locking collars 74. The jack shaft 73 extends outwardly through the left transverse end of the slide 54 and suitable mounted thereon is a crank handle 75 for rotating the jack shaft 73. Thus, when the crank handle 75 is rotated, the jack shaft 73 will rotate and cause the link 72 to laterally shift therealong, and thereby shifting the position of the cast metal housing 69.

The housing 69 is laterally bored to accommodate a saw blade mounting shaft 76 which is journaled in radially and thrust bearings 77, the latter being suitably mounted within the bore of the housing 69. Also mounted upon the shaft 76 adjacent each end of the housing 69 are annular sealing rings 78 preferably formed of neoprene rubber or similar material normally used for sealing lubricating oil. The mounting shaft 76 extends forwardly of the housing 69 and is formed with a diametrally enlarged portion 79 which, in turn, integrally merges into a turned down or diametrally reduced portion 80 for mounting a conventional saw blade 81. By fitting bushings of various external diametral sizes over shaft 76, it can be seen that the mounting shaft 76 is capable of handling saw blades having various sized mounting hubs.

A pair of clamping plates 82, 83, are disposed on each side of the saw blade 81 to prevent buckling of the blade 81 during the grinding process, each of the plates 82, 83, further being reinforced by a plurality of radially extending gussets 84, all of which together with shaft 79 constitute blade-holding means. The saw blade 81 is conventional in construction, and, therefore, neither illustrated nor described in detail herein. Moreover, it should be noted that the automatic saw grinder A is not limited to blades of the diameter shown in FIG. 1 and any blade of almost any diameter within a large range can be suitably sharpened or ground on the saw grinder A.

The outer end of the mounting shaft 76 is threaded for accommodating a locking nut 85 for holding the saw blade 81 and the clamping plates 82, 83, in a rigid position. Referring now to FIGS. 8 and 9, mounting shaft 76 extends rearwardly of the cast metal housing 69 into a clutch housing 86, the latter being bolted or otherwise rigidly secured to the housing 69. Mounted upon the extended end of the shaft 76 adjacent the forward end of the clutch housing 86 is a washer 88. Disposed about the shaft 76 and keyed thereto is an axially extending sleeve 89, having a diametrically reduced portion 90, thereby forming an annular shoulder 91. The sleeve 89 is retained on the shaft 76 by means of a set collar 92 and a set screw 93. Disposed about the sleeve 89 and abutting the washer 88 and the annular shoulder 91 is a circular brake plate 94. It can be seen, by reference to FIG. 8, that the annular shoulder 91 abuts the brake plate 94 and holds the same in rigid position with respect to the sleeve 89. A portion of the sleeve 89 is externally threaded for accommodating a locking ring 95 which is axially slit and retained by means of a bolt 96. Interposed between the locking ring 95 and the brake plate 94 is a slip clutch 97 which includes a pair of spaced clutch plates 98, 99, and which are retained in axial alignment by means of pins 100. Each of the plates 98, 99, are axially bored to accommodate compression springs 101 for spring-biasing each of the clutch plates 98, 99, into frictional engagement with the locking ring 95 and the brake plate 94, respectively. It should be noted that the clutch plates 98, 99, are mounted upon the shaft 76 by means of bushings 102, and that washers 102', 102'', are interposed between the clutch plate 98, and the locking ring 95, and the clutch plate 99 and the brake plate 94, respectively. The clutch plate 99 is annularly provided with a set of gear teeth 103 which engage a vertically shiftable rack bar 104, the latter being shiftable within a vertical slot 105 formed within the clutch housing 86.

The upper end of the rack bar 104 is secured, by means of bolt 106, to the lower end of a piston rod 107 having a lowered clevised end 108. The piston rod 107 is operatively mounted within a double acting hydraulic cylinder 109 having upper and lower fluid ports 110, 111, respectively. Welded or otherwise rigidly secured to the rack bar 104 is an outwardly extending actuating arm 112 which is movable between a pair of vertically spaced limit switches 113, 114. The limit switch 113 is rigidly secured to the cast metal housing 69 and supports a jack shaft 115, the lower end of which is journaled in a boss 116, also rigidly secured to the cast housing 69. Secured to the upper end of the jack shaft 115 is a crank handle 117 for turning the jack shaft 115 and thereby regulating the vertical position of the lower limit switch 114, with respect to the upper limit switch 113. Thus, it can be seen that the distance that the rack bar 104 will move within the slot 105 can be regulated by adjusting the position of the limit switches 113, 114. Each of the limit switches 113, 114, can further be provided with bumper pads 118, 118', respectively, if desired.

Mounted on the upper end of the clutch housing 86 adjacent to the brake plate 94 is a set of brake cylinders 120, 121, being provided respectively with movable pistons 122, 123, the outer ends of which are provided with bearing plates 124, 125, respectively, the latter being adapted to bear against each of the flat surfaces of the brake plate 94. The cylinders 120, 121, are each provided with fluid ports 126, 126', for receiving fluid under pressure and thereby forcing the bearing plates 124, 125, into braking contact with the brake plate 94, and as this happens, the slip clutch 97 will slip about the shaft 76. By means of the above-outlined construction, it can be seen that the rack bar 104 will move within the slot 105 responsive to fluid under pressure being pumped into the hydraulic cylinder 109. When the fluid is pumped through the port 110 into the cylinder 109, thereby forcing the rack bar 104 downwardly, the bar 104 will move between the predetermined distance set by the limit switches 113, 114.

As the rack bar 104 moves downwardly, it will rotate the clutch plates 98, 99, as it is in contact with the gear teeth 103. As the clutch plates 98, 99, are spring biased into contact with the ring 95, and the brake plate 94, the latter being secured to the shaft 76, they will rotate the shaft 76 as the rack bar 104 is moved downwardly. This will, in turn, rotate the saw blade 81 in order to correctly position the next tooth thereon to be sharpened.

It is obvious that the shaft 76 can only rotate in one direction, or else, saw blade 81 would be advanced in one direction as the rack 104 moved downwardly and the other direction as the rack bar moved upwardly. Therefore, the brake cylinders 120, 121, prevent rotation of the shaft 76 as the rack bar 104 moves upwardly. Thus, when fluid is supplied to the port 111 of the double acting hydraulic cylinder 109, this will force the piston rod 107 upwardly and carry therewith the rack bar 104. At the same time that fluid is supplied to the port 111 of the cylinder 109, fluid will also be pumped into the ports 126, 126', of the brake cylinders 120, 121, thereby forcing the bearing plates 124, 125, into contact with the brake plate 94. This will cause the clutch plates 98, 99, to slip about the sleeve 89 and thereby prevent rotation of the shaft 76. Thus, it can be seen that the saw blade 81 will not advance during the upward movement of the rack bar 104. If it is desired to rotate the shaft 76 so that two or more teeth on the saw blade 81 are advanced, the position of the lower limit switch can be moved to a lower position, thereby permitting the rack bar 104 to move downwardly and upwardly for a greater distance, and thereby rotate the clutch plate 99 for a greater degree of rotation.

In order to stop the operation of the automatic saw grinder A after all of the teeth on the saw blade 81 have been sharpened, the grinder A, as will be seen by reference to FIGS. 7 and 8, is provided with a cycle switch actuator 127 which includes a movable arm 128 having an enlarged hub 128', the latter being secured to the rearward end of the shaft 76 by means of a locking collar 129 and a bolt 130. The locking collar 129 and the extending end of the shaft 76 are axially drilled to accommodate a plurality of radially spaced pins 131 in order to prevent the movable arm 128 from rotating with respect to the shaft 76. Thus, it can be seen that the arm 128 will rotate with the shaft 76 and that as the shaft 76 has completed one cycle of 360° rotation, the movable arm 128 will also complete one 360° cycle of rotation. The lower end of the arm 128 is provided with a roller 132 which is adapted to trip an electrical cycle switch 133 having a contact 134. The switch 133 is powered by an electrical conductor 135 and is designed to stop the operation of the saw grinder A when the contact 134 is actuated. By reference to FIG. 7, it can be seen that the switch 133 is provided with a pair of elongated elliptically shaped apertures 136 for suitably positioning and bolting the switch 133 to the clutch housing 86 by means of bolts 137. The electrical cycle switch 133 is conventional and, therefore, neither illustrated nor described in detail herein.

In order to position precisely the next tooth which is to be ground, the automatic saw grinder A is provided with indexing means 138, reference being made to FIG. 10, which includes a base plate 139 bolted to the top wall 11 by means of bolts 140. Bolted to the base plate 139 is a double acting hydraulic cylinder 141 having upper and lower fluid ports 142, 143, respectively, and operatively disposed within the cylinder 141 is a piston 144. Bolted to the upper end of the hydraulic cylinder 141 is a lower link casing 145 which is provided with a central bore 146 for slidably accommodating a cylindrical pivot support block 147, the latter being threadedly secured to the upper end of the piston 144 and held firmly by means of nut 148. The exterior annular surface of the cylindrical pivot support block 147 is sized to fit loosely within the walls of the bore 146. In order to vent the bore 146 during the movement of the support block 147, the casing 145 is provided with a lower air venting aperture 149 which communicates with the bore 146. Disposed upon and supported by the upper end of the lower link casing 145 is an upper link casing 150 integrally provided with an annular outwardly extending flange 151. Disposed about and concentrically encircling the upper link casing 150 is an annular locking ring 152 which is provided with an internal annular shoulder 153, the latter abutting the flange 151 and forcing the flange 151 into engagement with the lower casing 145. The locking ring 152 is secured to the lower casing 145 by means of bolts 154. By means of this construction, it can be seen that the upper casing 150 is rotatable with respect to the lower casing 145. In order to secure the lower casing 145 to the upper casing 150, and thereby prevent rotation, the lower casing 145 is provided with a vertical bore 155, the lower end of which is internally threaded for accommodating a set screw 156, the upper end of which bears abuttingly against a vertically slidable pin 157. Thus, when the set screw 156 is tightened within the bore 155, the upper end of the pin 157 will abut the flange 151 and force the same into locking engagement with the annular shoulder 153. Contrariwise, when the set screw 156 is loosened, the pin 157 will drop free and the upper casing 150 will be freely rotatable with respect to the lower casing 145. The lower casing 145 is internally bored to accommodate a compression spring 158 which bears at its upper end against a hemispherical detent 159, the latter being sized to engage a plurality of complementary indexing recesses 159′ formed on the underside of the annular flange 151. Thus, it can be seen that the upper casing 150 is rotatable with respect to the lower casing 145 and can be positioned in any of the plurality of positions defined by the indexing recesses 159′.

The pivot support block 147 is provided with a horizontal elongated groove 160 and rockably mounted thereon by means of a pin 161 is a driving link 162 which is provided with an upwardly extending portion 163 forming a relatively flat annular shoulder 164, the latter being adapted to abut the upper end of the upper link casing 150, substantially as shown in FIG. 10. The upper portion 163 extends through a rather large diameter aperture 165 formed in the upper casing 150 and has a beveled edge 166. The driving link 162 is also integrally formed with a downwardly extending somewhat arcuate projection 167 which is adapted to abut an annular shoulder 168 formed within the lower casing 145.

Also rockably mounted on the pin 161 is a follower link 169 which is parallel to, and in facewise abutment with, the link 162 and is integrally provided with a horizontal flange 170 which, in turn, integrally merges into an upstanding head 171. Secured to the head 171 by means of a bolt 172 is a cylindrical jacket 173 having an internal bore 174 which is larger than the relative thickness of the links 162, 169, so that the link 162 will be movable within the bore 174 about the pin 161. The follower link 169 is provided with a horizontal pin 175 which engages a rectangular slot 176 formed within the upper portion 163 of the driving link 162. Mounted within the jacket 173 is an adjusting bolt 177 which engages one lateral margin of the driving link 162. Secured to the jacket 173 and projecting radially therefrom on the opposite side thereof in relation to the bolt 177 is a retainer cup 178 containing a compression spring 179 which abuts the opposite lateral margin of the driving link 162. By reference to FIG. 13, it can be seen that the pivot support block 147 is prevented from rotating within the bore 146 by means of a key k which is movable within a keyway w formed within the pivot support block 147, the key k being rigidly secured to the upper casing 150 by means of a pin 180. The driving link 162 is positioned at its uppermost limit, that is the position shown in FIG. 10, and, if the adjusting bolt 177 were entirely removed from the casing 145, the casing 145 would tend to move to the right by the action of the compression spring 179 on the driving link 162. Thereupon, the horizontal pin 175 would engage the rectangular slot 176 of the driving link 162. Therefore, it can be seen that the jacket 173 would be tilted slightly to the right about the pivot pin 161. By means of this construction, the position of the jacket 173 can always be adjusted relative to the driving link 162 by means of the adjusting bolt 177. Thus, when fluid is pumped through the lower port 143 of the cylinder 141, the piston 144 will be urged upwardly carrying therewith the pivot support block 147 and the links 162, 169. As the annular shoulder 164 abuts the upper end of the upper casing 150, the driving link 162 will be maintained in a rigid position. The position of the follower link 169 and of the cylindrical jacket 173 which is secured thereto can be adjusted with respect to the driving link 162 by means of the adjusting bolt 177.

If fluid is pumped in through the upper fluid port 142 into the cylinder 141, the piston 144 will be moved downwardly and carrying therewith the pivot support block 147. As the driving link 162 moves downwardly, the projection 167 will abut the annular shoulder 168 causing the driving link 162 to pivot about the pin 161. Thus, the left hand side of the link 162 (reference being made to FIG. 10) will still continue to pivot downwardly while the projection 167 abuts the annular shoulder 168, thus causing the driving link 162 to tilt to the left. As the driving link 162 is tilted to the left, it will bear against the adjusting bolt 177 and rock the entire jacket 173 and the follower link 169 in the direction indicated by the arrow in FIG. 10.

Secured to the underside of the jacket 173 and extending downwardly therefrom is a cover 181 which encloses the upper casing 150 and prevents any liquid from accumulating thereon. Also secured to the jacket 173 and communicating interally thereof is an oil cup 182 for lubricating the links 162, 169, and which is conventionally provided with a pivoted lid 183. Mounted upon the upper end of the jacket 173 and adjustably retained thereon by the bolt 172 is a horizontally extending support plate 184 which, when locked in place, is movable with the jacket 173, and secured to the outer end thereof is a telescopic tube assembly 185 consisting of a lower tube 186 secured to the plate 184. Concentrically disposed about the lower tube 186 and vertically shiftable thereon is an upper tube 187, the latter having an annular flange 188 which can be tightened by means of a bolt 189. Secured to the upper end of the upper tube 187 is an indexing finger 190 which extends upwardly and outwardly with respect to the upper tube 187.

When hydraulic fluid is supplied to the upper port 110 of the cylinder 109, the piston rod 107 will move downwardly and carry therewith the rack bar 104, thereby rotating the spindle 76 and the saw blade supported therewith in a clockwise direction (reference being made to FIG. 9), bringing the next tooth to be ground up through and past grinding position. When actuating arm 112 strikes lower limit switch 114, fluid will be supplied to the lower port 143 of the double acting hydraulic cylinder 141, causing the piston 144 to move upward, carrying therewith the pivot support block 147 and the links 162, 169. The annular shoulder 164 of the driving link 162 will engage the upper link casing 150 and hold the casing 173 and related structure in position. As the indexing finger 190 is rigidly secured to the upper end of the jacket 173, it will be moved to, and held in, its "indexing" position, that is, the position where it is located immediately beneath the tooth which has just been moved up through and past grinding position, that is to say the next tooth to be sharpened. Thereupon, hydraulic fluid enters the lower port 111, moving the rack bar 104 upwardly. This upward movement tends to rotate the saw blade backwardly in a counterclockwise direction, bringing the tooth to be ground back into snug abutment against the indexing finger 190. Since provision is made for slippage between the clutch plate 99 and the spindle 76, the tooth to be ground will remain precisely in grinding position. Next fluid is supplied to cylinders 120, 121, causing the bearing plates 124, 125, to engage the brake plate 94 and hold it and the saw blade 81 in the correct position for subsequent grinding.

When it is desired to return the indexing finger 190 to its original position, fluid will be supplied to the upper port 142 of the double acting hydraulic cylinder 141, causing the piston rod 144 to move downwardly and shift the pivot support block 147 and the links 162, 169, downwardly also. As this occurs, the left hand side of the link 162, reference being made to FIG. 10, will continue to move downwardly until the projection 167 abuts the annular shoulder 168. This will cause the driving link 162 to tilt to the left and thereby bear against the adjusting bolt 177. This will, of course, pivot the entire jacket 173 and the follower link 169.

It can be seen that the indexing device 138 compensates for and corrects any slight error which might be introduced in the setting of the limit switches 113, 114. The indexing position of the finger 190 can be adjusted by adjusting the position of the adjusting bolt 177. Also, the height of the indexing finger 190 can be regulated by adjusting the position of the upper tube 187 on the lower tube 186. By the adjusting of the various positions of the indexing finger 190, it is possible to locate each tooth of the saw blade 81 in a predetermined desired grinding position.

Referring now to FIGS. 14-16, the top wall 11 is integrally formed with an upstanding pedestal-like support element or open-ended boss 191 and mounted on the upper end thereof is a horizontal cover plate 192, which is suitably apertured to accommodate a vertical cylindrical guide sleeve 193, the latter being integrally formed with an outwardly extending annular flange 194 for bolting to the boss 191 by means of bolts 195. Operatively disposed within the guide sleeve 193 and vertically shiftable therein is an elevating column 196 having an integrally formed diametrally enlarged top plate 197. Integrally formed with the under-surface of the top plate 197 and extending downwardly therefrom is a guide flange 198 which engages the outer peripheral surface of the guide sleeve 193. The guide sleeve 193 is annularly grooved on its internal and external surfaces, intermediate its upper and lower ends, for providing an upper annular bearing surface 199 and a lower annular bearing surface 200, so that the elevating column 196 is capable of shifting vertically within the guide sleeve 193 with a reduced surface contact, and hence with less friction. The elevating column 196 is provided with a relatively flat vertical surface 201 for suitably mounting a vertical rack bar 202 secured by means of bolts 203. The cylindrical guide sleeve 193 is integrally formed with a pair of outwardly extending flanges 204, one of which is grooved to form a keyway 205 for accommodating the rack bar 202. By this construction, the rack bar 202 is permitted to shift vertically within the keyway 205, and the elevating column 196 will be retarded against rotative movement about its longitudinal axis. Provided for bolted attachment to the flanges 204 is a gear housing 206 having an annular outwardly extending flange 207 which matches the flanges 204 and is secured thereto by means of bolts 208. During its vertical shifting movement, the rack bar 202 will mesh with a pinion gear 209 which is mounted on a shaft 210, the shaft 210 being journaled in the end wall of the gear housing 206. Rigidly secured to and rotatable with the shaft 210 is a worm wheel 211 which is in meshing engagement with a worm 212, which is, in turn, mounted on an outwardly extending shaft 213. The shaft 213 is journaled within radial and thrust bearings 214, 215, which are mounted within the walls of the gear housing 206 and are retained by means of retaining collars 216, 217. The housing 206 can be preferably provided with a filler plug 218 which is removable in order to inject lubricating oil within the housing 206 for lubricating the various movable parts. The shaft 213 extends outwardly of the front wall 3 through a bearing cap 219 which is secured to an outwardly extending boss 220 formed on the front wall 3, the shaft 213 being journaled in bearings 221 which are, in turn, suitably mounted within the boss 220. Rigidly secured to the outer end of the shaft 213 and rotatable therewith is a crank handle 222 for conveniently turning the shaft 213. Thus, when the shaft 213 is turned by the crank handle 222, it will rotate the worm 212 which will, in turn, rotate the worm wheel 211. This will, in turn, rotate the shaft 210 causing the pinion gear 209 to raise and lower the rack bar 202 and the elevating column 196 which is carried therewith.

The operation of the elevating column 196 is substantially similar to the operation of the previously described elevating column 18. Similarly, the vertical position of the elevating column 196 is adjusted by rotating the crank handle 222. In this connection, it should be noted that a force supplied to the top plate 197 will not force the elevating column 196 downwardly by back rotation of the various gears and worms. Due to the comparative size of the worm wheel 211 to the worm 212, it can be seen that a much greater force is necessary to rotate the worm 212 through the shaft 210 than it is to rotate the worm 212 through the shaft 213.

However, in order to maintain the elevating column 196 in a rigidly locked vertical position, the guide sleeve 193 is axially slit and formed with a pair of outwardly extending parallel flanges 223 which are connected by a cross-bar 224 suitably secured to the flanges 223 by means of bolts 225. A locking bolt 226, which suitably terminates outwardly of the front wall 3, in an enlarged handle 227, is threadedly mounted within the cross-bar 224 and bears against a shoe 228, the latter of which, in turn, bears against the annular surface of the elevating column 196. Thus, by turning the handle 227 in a direction to thread the locking bolt 226 within the cross-bar 224, the locking bolt 226 will bear against the shoe 228 which will, in turn, bear against the annular surface of the elevating column 196, thereby holding the column 196 in the locked position.

Rigidly secured to the top plate 197 by means of bolts 229 is a relatively thick flat horizontal plate 230 having an integrally formed guide block 231, the latter having a relatively flat top face 232 and a pair of downwardly converging side walls 233, which form longitudinally extending guide slots 234. Operatively mounted on the guide block 231 for longitudinal shifting movement, is a longitudinally shiftable slide 235 which is provided with a dovetail groove 236 on its underside for engagement with the converging side walls 233. The slide 235 is longitudinally bored to accommodate a jack shaft 237 and threadedly mounted thereon is a finger 238 which is secured to the underside of the longitudinally shiftable slide 235 and which is movable within an elongated groove 239 formed within the horizontal plate 230 and guide block 231, all as can best be seen in FIG. 16. Thus, it can be seen that the finger 238 serves as limiting device, in that it limits the longitudinal shifting movement of the slide 235 between the ends of the groove 239. The jack shaft 237 terminats at one end in a bearing sleeve 240 which is secured to the horizontal plate 230 and which is provided with bearings 241. The jack shaft 237 is further retained within the slide 235 by means of a thrust washer 242 which bears against one end wall of the groove 239, and a shoulder 243 formed on the jack shaft 237. Rigidly secured to the outer end of the jack shaft 237 is a crank handle 244 for rotating the jack shaft 237. Thus, when the crank handle 244 is turned, and the jack shaft 237 is rotated in one direction, it will move the finger 238, and consequently the slide 235, along the guide block 231. If the crank handle 244 and jack shaft 237 are turned in a reverse direction, the finger 238 will move in the opposite direction and carry therewith the longitudinally shiftable slide 235, thereby shifting the position of the slide 235 to any of a plurality of longitudinally shifted positions within the limits of the groove 239. A plurality of set screws s are mounted within the side of the slide 235 for securing the slide 235 to the guide block 231 in any of a plurality of longitudinally shiftable positions.

Disposed upon and supported by the longitudinally shiftable slide 235 is a lateral slide 245 having a horizontal plate 246 which is integrally formed with an upstanding vertical plate 247 and which is, in turn, reinforced by a set of gusset plates 248. The horizontal plate 246 is provided with a pair of laterally extending slots 249 for accommodating bolts 250 and washers 251, as best seen in FIG. 18. Thus, it can be seen that by releasing the bolts 250 the lateral slide 245 can be shifted laterally with respect to the longitudinal slide 235 and thence locked in a rigid position merely by tightening the bolts 250. The longitudinally shiftable slide 235 can be locked in any of the longitudinal shifted positions by means of set screws 252. It is, of course, obvious that the lateral movement of the lateral slide 245 is limited by the length of the laterally extending slots 249.

The vertical plate 247 is integrally formed with an enlarged cylindrical boss 253 for accommodating a pivot pin 254 upon which is mounted a support plate 255 having a pair of depending flanges 256, 257, which are mounted on the pivot pin 254. The pivot pin 254 integrally includes an enlarged head 258 at one end and is provided at its other end with a locking nut 259 and washer 260. Thus, it is possible to pivot the support plate 255 to any of a plurality of angularly located positions with respect to the lateral slide 245. Also mounted on the pivot pin 254 is a tilt indicator plate 261 which abuts against and is secured to the flange 257 by means of a series of bolts 262. The plate 261 depends from the pivot pin 254 and has an elongated arcuate slot s at its lower end. The vertical plate 247 is integrally provided with an extended arm 263 for retaining a locking bolt 264, the latter extending through the slot s. The bolt 264 is also provided with a washer 265. The tilt indicator plate 261 is preferably provided with indicia markings representing the degrees of tilt of the support plate 255. Thus, by loosening the bolt 264, it is possible to tilt the support plate 255 to an angular position with respect to the longitudinally shiftable slide 235. This degree of tilt is, of course, indicated by the tilt indicator plate 261. A marker 266 is preferably secured to the horizontal plate 246 of the lateral slide 245 for indicating the degrees of tilt indicator plate 261.

Bolted or otherwise rigidly secured to the upwardly presented surface of the support plate 255 is a bearing retainer plate 267 having V-shaped notches 268, 269, in each of its longitudinal side walls extending for the full length of the plate 267. Slidably disposed upon the bearing retainer plate 267 is a longitudinally shiftable plate 270 which is integrally formed with a pair of depending flanges 271, all as can best be seen in FIG. 18. The flanges 271 are also formed with a pair of V-shaped notches 272 on their inner walls which are companion to the V-shaped notches 268 for accommodating ball bearings 273, thereby affording relatively friction free slidable movements of the longitudinally shiftable plate 270. The foregoing thus comprise slide-forming means.

Bolted or otherwise rigidly secured to the upper surface of the longitudinally shiftable plate 270 is an upstanding flange 274 and secured to the flange 274 by means of bolts 275 and extending laterally outwardly therefrom is a T-shaped contact arm 276 which is movable between a pair of limit switches 277, 278. The T-shaped contact arm is integrally provided with a pair of outwardly extending leg portions 279 which are beveled at their outer ends and adapted to contact rollers 280, 281, pivotally mounted on the limit switches 277, 278. The limit switches 277, 278, are preferably provided with extended flanges 282, 283, respectively, and are mounted in a recessed portion of the horizontal support plate 255. Each of the flanges 282, 283, is provided with elongated slots 284, 285, respectively, for accommodating adjustable bolts 286, 287, respectively, and thereby providing positional adjustability to each of the limit switches 277, 278. Rigidly secured to the support plate 255 is a hydraulic ram mount 288 for rigidly retaining a power-actuated feeding means or hydraulic ram 289 consisting of a double-acting hydraulic cylinder 290 and a piston rod 291, the latter being threadedly secured to the T-shaped contact arm 276 and held firmly by means of bolt 292. The hydraulic ram 289 is operatively connected to a hydraulic control system and the limit switches 277, 278, are electrically connected to an electrical control system both of which are hereinafter described more fully in detail. Thus, if hydraulic fluid is supplied to one port of the double-acting hydraulic cylinder 290 the piston 291 will extend and cause the T-shaped contact arm 276 to move the longitudinally shiftable plate 270 toward the saw blade 81. The shiftable plate 270 will move until the beveled edge of the leg portion 279 contacts the roller 280, causing the roller 280 to swing downwardly and thus actuating the contact limit switch 277. An electrical impulse in the limit switch 277 will, in turn, shut off the supply of hydraulic fluid into the cylinder 290, thereby stopping the movement of the plate 270. When it is desired to retract the shiftable plate 270, hydraulic fluid is supplied to the opposite port of the cylinder 290 causing the piston rod 291 to retract. This will, in turn, carry therewith the contact arm 276 and the plate 270 will move along the support plate 255 until the beveled edge of the leg portion 279 contacts the roller 281. As this occurs, the roller 281 will be pivoted downwardly causing the limit switch 278 by means of electrical impulses to shut off the flow of hydraulic fluid to the cylinder 290. It is, of course, obvious that the distance traversed by the longitudinally shiftable plate 270 is regulated by the positioning of the limit switches 277, 278. Thus, if it is desired to extend the longitudinal distance traversed by the plate 270; the adjustable bolts 286, 287, are loosened so that the limit switches 277, 278, can be moved to any desired position within the recessed portion of the plate 255. The limit switches 277, 278, are conventional and, therefore, neither illustrated nor described in detail herein.

Rigidly secured to the top surface of the longitudinally shiftable plate 270 and angularly located with respect thereto, as will be seen by reference to FIGS. 16–19, is an L-shaped bracket 293 having a horizontal leg 294 and a vertical leg 295 which is reinforced by a gusset plate 296. Rigidly secured to the vertical leg 295 is a mounting bracket 297 and interposed between the bracket 297 and the bracket 293 is a dielectric plate 298, preferably formed of Teflon or other suitable electrically non-conductive material. The bracket 297 is secured to the bracket 293 by means of bolts 299 which are surrounded by, and completely insulated from the bracket 297 through dielectric sleeves 300. The bracket 297 is integrally formed with a tubular housing 301 which is axially split and formed with a pair of flanges 302 for accommodating a bolt 303. Disposed axially within the outer housing 301 is an inner casing 304 which is provided with upper and lower bearings 305, 306, respectively, for accommodating a vertical rotatable shaft 307. Interposed between the housing 301 and the inner casing 304 is a dielectric sleeve 308 which, in effect, insulates the outer housing 301 from the inner casing 304. Rigidly, secured to the lower end of the shaft 307 is a grinding wheel 309 which is formed of a relatively hard high carbon steel and is preferably provided with a diamond cutting edge. By reference to FIG. 2, it can be seen that the grinding wheel 309 is vertically located so as to be in approximate horizontal alignment with the saw blade 81. Rigidly secured to the upper end of the shaft 307 is a pulley 310 which is retained by means of a spanner nut 311 and a locking nut 312.

Rigidly secured to the bracket 297 by means of bolts 313 is a motor mount 314 and secured to the outer face thereof is a dielectric plate 315 for retaining a conventional electric motor 316. The dielectric plate 315 is secured to the motor mount 314 in any conventional manner such as by bolts 317 which are mounted within dielectric sleeves 318 in the manner as shown in FIG. 19. Secured to the upper end of the electric motor 316 and rotatable with the rotor shaft forming a part thereof is a pulley 319 which is operatively connected to the pulley 310 through a belt 320. Thus, it can be seen that the grinding wheel 309 can be powered through the electric motor 316 in the formation of grinding means and, moreover, the housing 301 and the motor 316 are dielectrically insulated from the bracket 297 and the remainder of the saw grinder A.

By reference to FIGS. 16 and 17, it can be seen that an upstanding post 321 is rigidly mounted on the bracket 297 which supports a dielectric block 322 for retaining a pair of carbon brushes 323, both of which bear against the annular surface of the spanner nut 311. The block 322 is provided with a terminal 324 which is electrically connected to the brushes 323 and connected to the terminal 324 is a conductor 325 which is connected, in turn, to an electrolytic-assist 326, the latter being conventional in construction, and, therefore, is neither illustrated nor described in detail herein. Thus, by means of the electrolytic-assist 326, an electrical charge can be supplied to the grinding wheel 309 as an aid in the grinding of the saw blade 81. It should be understood that the shaft 76 could be grounded through a second set of brushes (not shown), for electrically grounding the saw blade 81 in order to prevent grounding through the bearings supporting the shaft 76. It is to be noted that the motor 316 and the housing 301 containing the rotatable shaft 307 is completely insulated from the bracket 297, and, therefore, it is possible to operate the saw grinder A with the electrolytic-assist 326 without endangering any personnel operating the grinder A. It should be understood that the electrolytic assist 326 is an attachment to the saw grinder A for electrostatically grinding the saw blades 81. However, the saw grinder A is completely operable without the electrolytic assist 326.

By means of the above-outlined construction, it can be seen that the grinding wheel 309 is adjustably mounted so that it may be brought into contact with the saw blade 81 in a variety of positions, thereby enabling the grinder A to accommodate a large variety of saw blades. It is possible to adjust the longitudinal position of the grinder wheel 309 with respect to the saw blade 81 by adjusting the longitudinally shiftable slide 235 by means of the crank handle 244. Thus, by turning the crank handle 244 and the jack shaft 237 it is possible to shift the slide 235 either toward or away from the saw blade 81. Thereupon, the slide 235 can be locked in a rigid position by tightening the set screws 252. As previously described, the saw blade 81 is laterally positioned with respect to the grinder wheel 309 rather than grinder wheel 309 being positioned with respect to the saw blade 81. This, as previously described, as accomplished by shifting the laterally shiftable slide 54. However, if it is desired, it is possible to laterally shift the position of the grinder wheel 309 through the lateral slide 245. This is accomplished by merely releasing the bolts 250 and permitting the slide 245 to shift within the limits of the laterally extending slot 249. This lateral adjustment, however, is seldom used as the thickness of the saw blade 81 does not vary considerably between the wide variety of blades used on the saw grinder A.

When positioning the grinding wheel 309 with respect to the saw blade 81, the longitudinally shiftable slide 235 is moved toward the saw blade 81 by manipulation of the crank handle 244 and the jack shaft 237. As the grinding wheel 309 engages one of the teeth of the saw blade 81 to a desired depth, the limit switch 277 is positioned so that the leg portion 279 will engage the roller 280 and actuate the limit switch 277 at this position. After the longitudinal and the lateral positioning of the grinding wheel 309 is attained with respect to the saw blade 81, the support plate 255 can be angularly positioned with respect to the laterally shiftable slide 245, and thereby angularly position the grinding wheel 309 with respect to the saw blade 81 for maintaining a desired degree of pitch. This is accomplished by releasing the locking bolt 264 and permitting the entire support plate 255 to pivot about the pivot pin 254. The desired degree of angularity will be indicated on the tilt indicator plate 261, at which position the locking bolt 264 is then tightened. In operation, fluid is supplied to the cylinder 290 so that the piston 291 will move the longitudinally shiftable plate 270 carrying therewith the grinding wheel 309. As the grinding wheel 309 makes its first pass and performs its first grinding operation, the leg portion 279 will contact the limit switch 277, thereby sending an impulse to the circuitry, to be hereinafter described, and thence stopping the flow of fluid to the cylinder 290. At the same time, fluid will then be supplied to the opposite port of the cylinder 290 causing the piston 291 to retract and thereby withdraw the longitudinally shiftable plate 270 and the grinding wheel 309.

If desired, the electric motor 316 and the tubular housing 301 can be provided with a plastic or synthetic resin dust cover 327 which is secured to an upstanding support block 328, the latter being welded or otherwise rigidly secured to the bracket 297. Rigidly secured to the topside of the bracket 293 is a spray pipe 329 which is connected to the coolant reservoir 7 in the base 1 and is provided with liquid coolant under pressure by means of a coolant pump 330. Thus, it can be seen that coolant is supplied to the grinding wheel 309 for preventing excessive heat formation during the cutting operations. A pressure regulating valve 331 is also preferably interposed in the spray pipe line 329 for regulating the amount of coolant.

The saw grinder A is fully automatic in its operation and is provided with a hydraulic control system and a electrical control system which are schematically illustrated in FIGS. 20a through 20d, and which will be more fully hereinafter described in detail.

The hydraulic control system 332 is suitably mounted within a control box 334 which is rigidly secured to the base 1. The hydraulic control system 332 is schematically shown in FIGS. 20a, 20b, 20c, and 20d, and includes a two-way three-position grinder control valve 335 which is connected to the hydraulic ram 289. The control valve 335 is operatively connected to and operable by a grinder advance solenoid 336 and a grinder return solenoid 337. A pair of flow control valves 338, 339, are interposed between the hydraulic ram 289 and the control valve 335.

A two-way two-position saw blade advance control valve 340 is connected to the fluid ports 110, 111, of the double acting hydraulic cylinder 109, the piston rod 107 of which is connected to and operates the rack bar 104. The advance control valve 340 is operatively connected to and operable by a reset solenoid 341 and an advance solenoid 342. A pair of flow control valves 343, 344, are interposed between the valve 340 and the double acting hydraulic cylinder 109. A two-way two-position index control valve 345 is hydraulically connected to the fluid ports 142, 143, of the double acting hydraulic cylinder 141, the piston 144 of which is operatively connected to the indexing device 138. The control valve 345 is operatively connected to and operable by a pair of solenoids 346, 347. A pair of flow control valves 348, 349, are interposed between the hydraulic cylinder 141 and the control valve 345.

A two-way two-position brake control valve 350 is hydraulically connected to the fluid ports 126, 126′, of each of the hydraulic brake cylinders 120, 121. The brake control valve 350 is operatively connected to and operable by a solenoid 351.

Figure 20A:
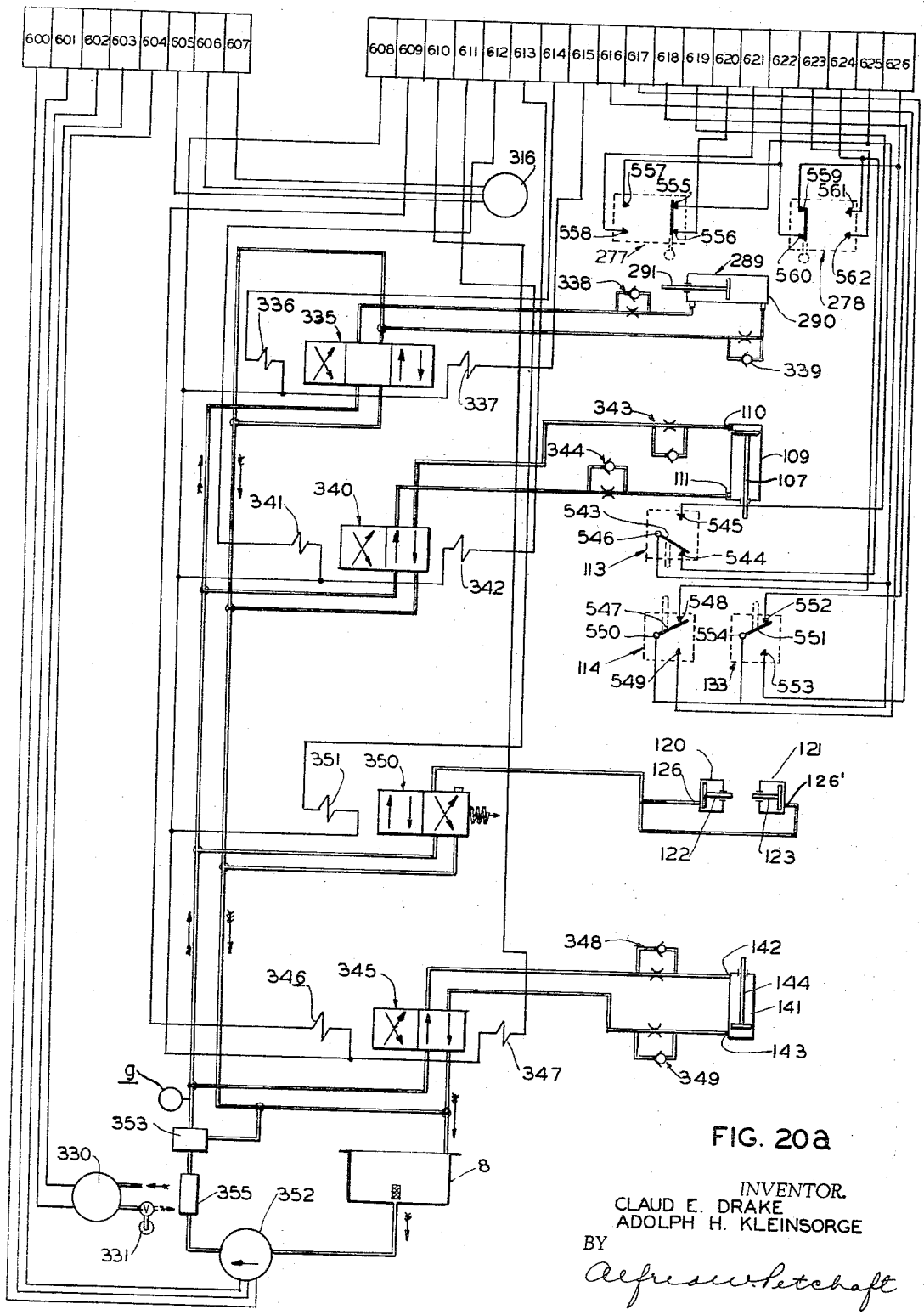
Figure 20:
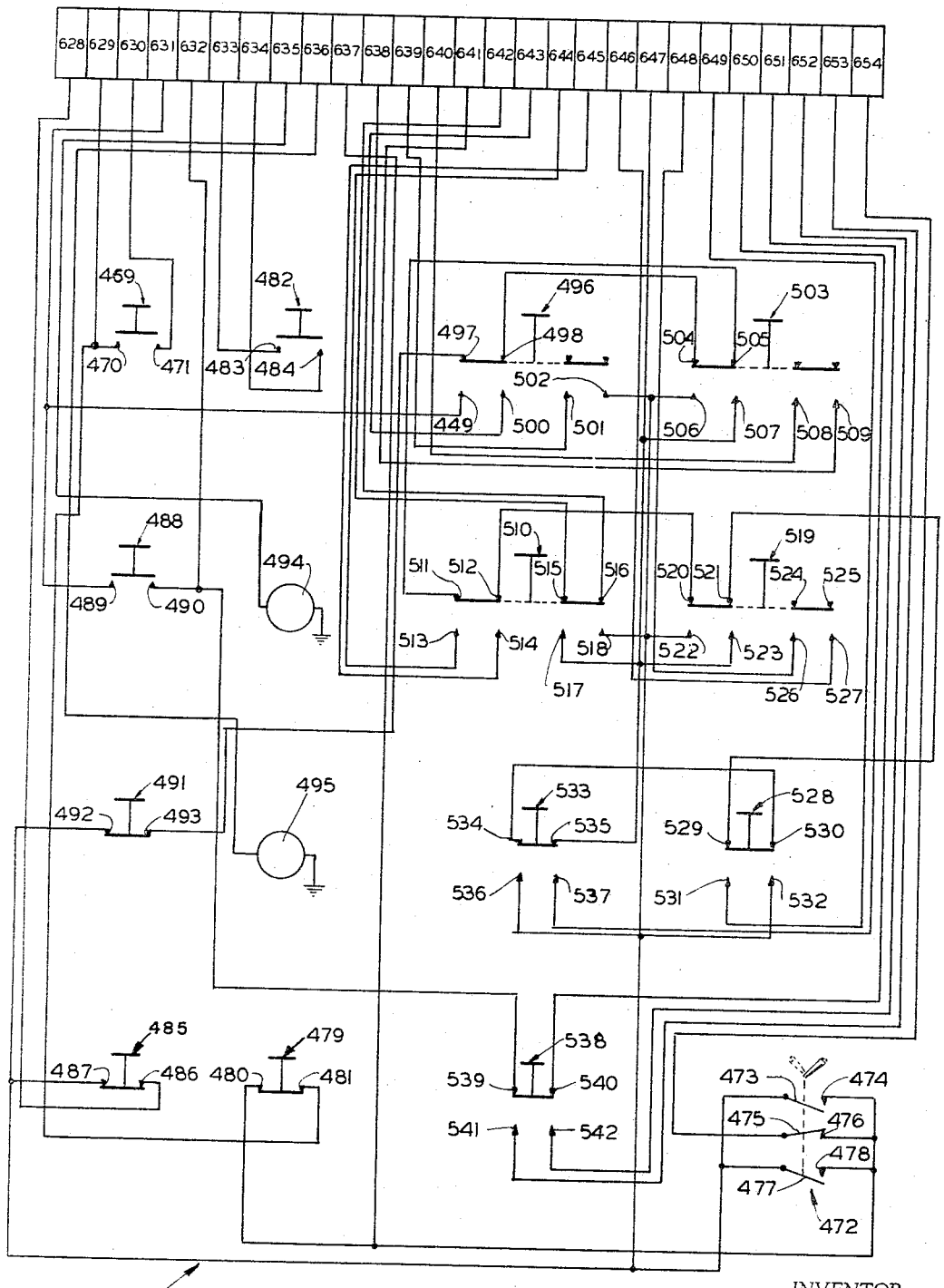
Figure 20:
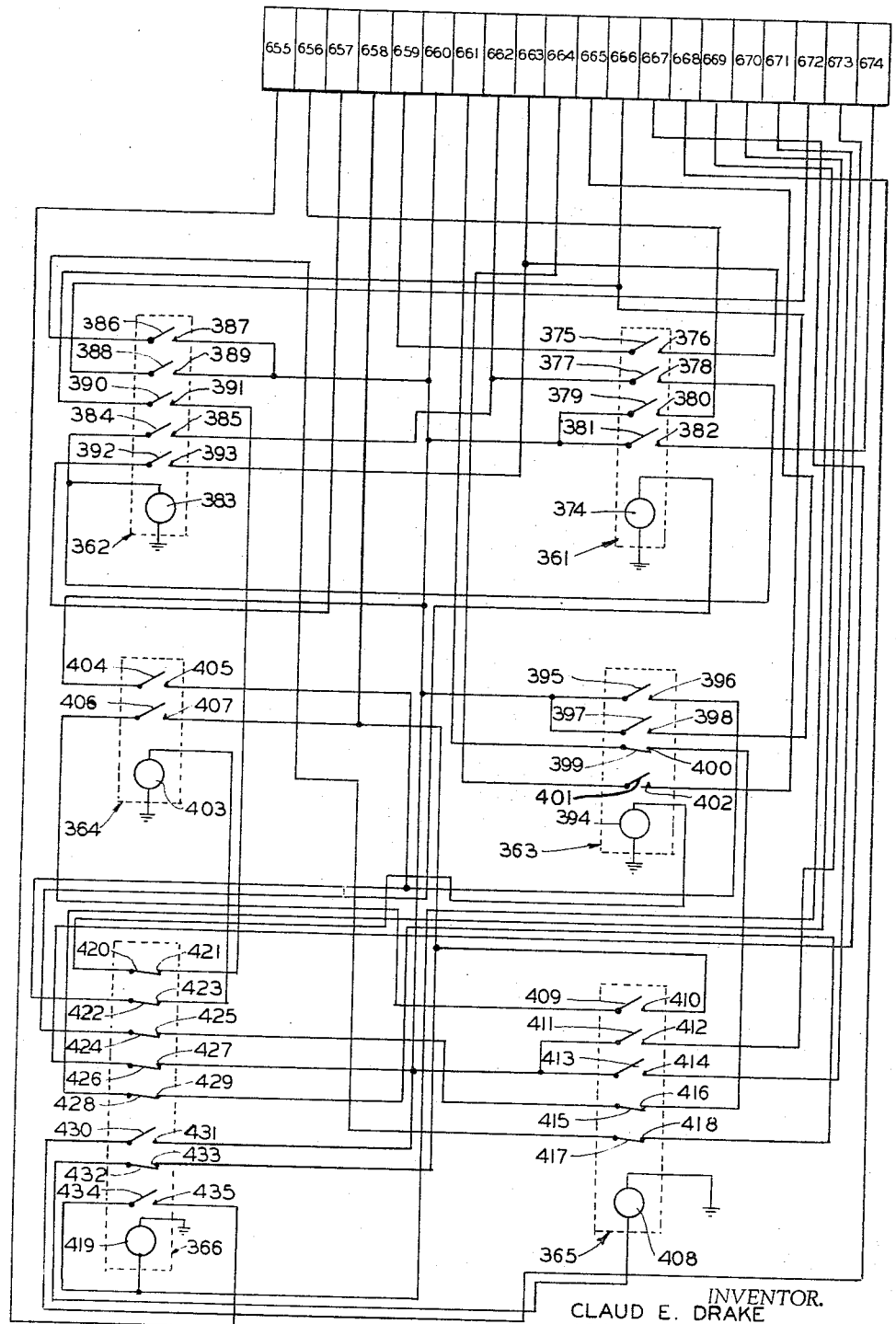
Figure 20:
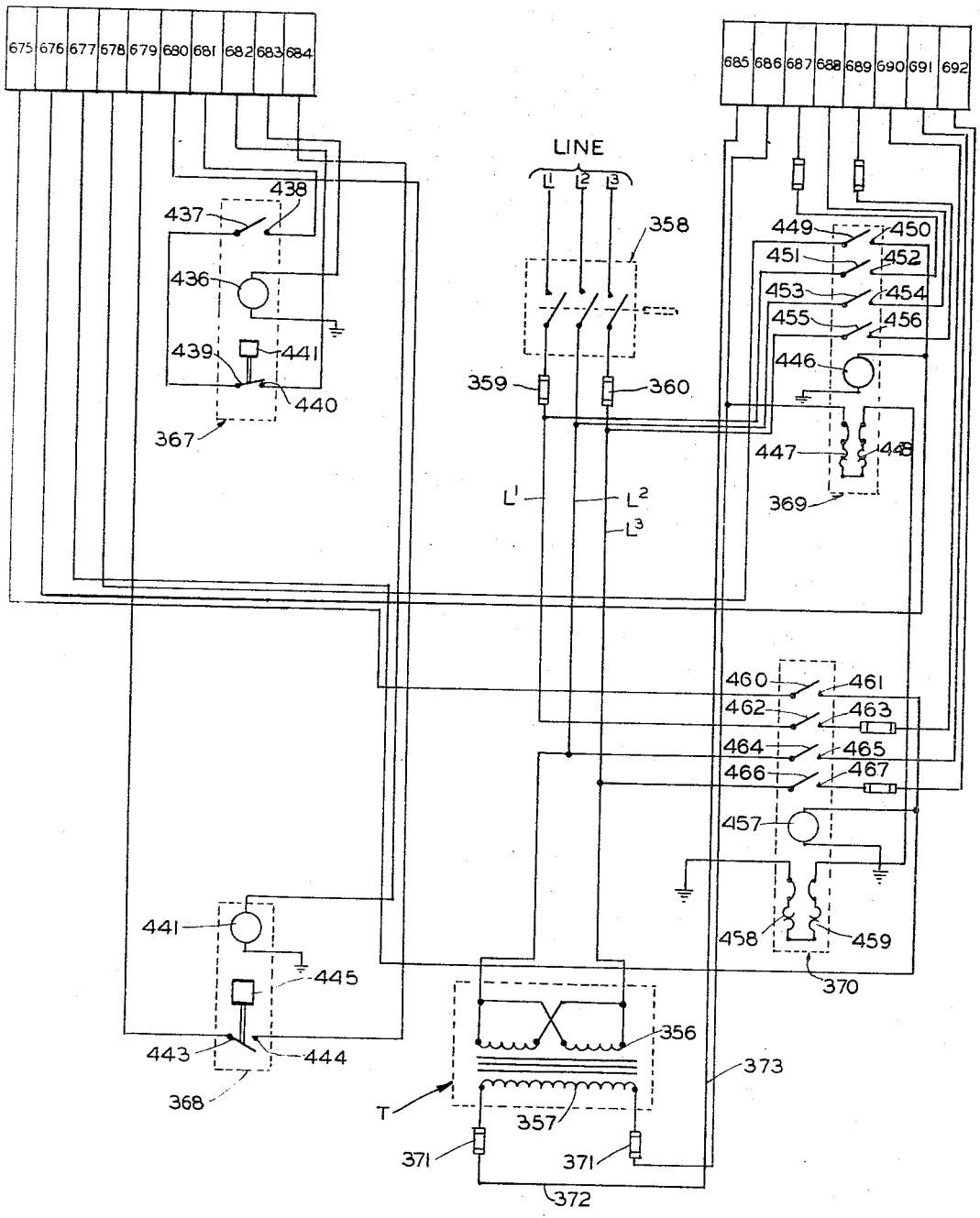

The control valves 335, 340, 345, 350, are all hydraulically connected to the reservoir 8 formed within the base 1 and to a fluid motor-pump combination 352 which is mounted on the base 1. A pressure relief valve 353 is interposed in the high-pressure lines connected to the valves 335, 340, 345, 350, and bypass each of said valves to the reservoir 8. A filter 355 is preferably interposed in the high pressure lines. Thus, it can be seen by means of the above-outlined construction that if the valve 335 is biased to a center position, that is the position as shown in FIG. 20a, that the pressure relief valve 353 will open relieving the pressure on the pump 352 to the reservoir 8. A pressure gauge g can be interposed in one of the aforementioned high pressure lines. It can further be seen that each of the valves 340, 345 and 350 are designed to actuate their respective various pistons 107, 144, 122, and 123. Thus, after these pistons have reached their extended positions, the pressure relief valve 353 will again open and reduce the pressure in the high pressure lines.

The electrical control system 333 is suitably mounted in a control box 333′ and includes a transformer t having a primary coil 356 and a secondary coil 357, the primary coil 356 being connected across a set of 220 volt three-phase electrical conductors $L^1$, $L^2$, and $L^3$. A main off-on power switch 358 is connected across each of the conductors $L^1$, $L^2$, $L^3$, and, moreover, a set of fuses 359, 360, is interposed in conductors $L^1$, and $L^3$, respectively.

Electrically connected across the secondary coil 357 in the manner as shown schematically in FIGS. 20c and 20d are ten relays 361, 362, 363, 364, 365, 366, 367, 368, 369, and 370. A pair of fuses 371 may be optionally interposed in conductors 372, 373, connected to the secondary 357.

The relay 361 includes a solenoid coil 374, a set of normally open holding contacts 375, 376, a set of normally open contacts 377, 378, a set of normally open contacts 379, 380, and a set of normally open contacts 381, 382. The relay 362 includes a solenoid coil 383, a set of normally open holding contacts 384, 385, a set of normally open contacts 386, 387, a set of normally open contacts 388, 389, a set of normally open contacts 390, 391, and a set of normally open contacts 392, 393.

The relay 363 includes a solenoid coil 394, a set of normally open contacts 395, 396, a set of normally open contacts 397, 398, a set of normally closed contacts 399, 400, and a set of normally open contacts 401, 402. The relay 364 includes a solenoid coil 403, a set of normally open contacts 404, 405, and a set of normally open contacts 406, 407. The relay 365 includes a solenoid coil 408, a set of normally open holding contacts 409, 410, a set of normally open contacts 411, 412, a set of normally open contacts 413, 414, and two sets of normally closed contacts 415, 416, and 417, 418.

The relay 366 includes a solenoid coil 419, a set of normally closed contacts 420, 421, a set of normally closed contacts 422, 423, a set of normally closed contacts 424, 425, a set of normally closed contacts 426, 427, a set of normally closed contacts 428, 429, a set of normally open contacts 430, 431, a set of normally closed contacts 432, 433, and a set of normally open holding contacts 434, 435. The relay 367 includes a solenoid coil 436, a set of normally open contacts 437, 438, and a set of normally closed contacts 439, 440, which, when opened, are held open for a predetermined interval by a conventional pneumatic time-delay mechanism 441. The relay 368 includes a solenoid coil 442 and a set of normally open contacts 434, 444, which, when opened, are held open for a predetermined interval by a conventional pneumatic time-delay mechanism 445.

The relay 369 includes a solenoid coil 446, a set of overload switches 447, 448, connected in series, a set of normally open holding contacts 449, 450, a set of normally open contacts 451, 452, a set of normally open contacts 453, 454, and a set of normally open contacts 455, 456. The contacts 451, 453, and 455 are connected to conductors $L^1$, $L^2$, $L^3$, respectively, as shown in FIG. 20d.

The relay 370 includes a solenoid coil 457, a pair of overload switches 458, 459, connected in series, a set of normally open holding contacts 460, 461, a set of normally open contacts 462, 463, a set of normally open contacts 464, 465, and a set of normally open contacts 466, 467. The contacts 462, 464, and 466 are also connected through the switch 358 to conductors $L^1$, $L^2$, $L^3$, respectively.

The aforementioned relays are all electrically connected as schematically shown in FIGS. 20a, 20b, 20c, and 20d, and are, moreover, electrically connected to a control panel 468. Mounted within the control panel 468 is a grinder motor start switch 469 of the push-button type having normally open contacts 470, 471. An off-on motor switch 472 is mounted within the control panel 468 and includes normally open contacts 473, 474, normally closed contacts 475, 476, and normally open contacts 477, 478. A grinder motor stop switch 479 of the push-button type is mounted in the control panel 468 for shutting off the grinder motor 316 and includes normally closed contacts 480, 481. A pump motor start switch 482 of the push-button type is mounted within the control panel 468 and is electrically connected to the relay 370 for starting the pump motor 352. The push-button switch 482 includes normally open contacts 483, 484. An emergency stop switch 485 of the push-button type having normally closed contacts 486, 487, is interposed directly in line 372 and is adapted to shut off the supply of electrical current from the secondary 357 to the entire electrical control system 333 in the event of an emergency. An automatic cycle start push-button switch 488 is mounted in the control panel 468 for starting the automatic cycle of the saw grinder A. The push-button switch 488 includes normally open contacts 489, 490. An automatic cycle stop switch 491 is mounted within the control panel 468, and includes normally closed contacts 492, 493, for stopping the automatic cycle. The control panel 468 is also provided with a green automatic cycle indicator light 494, which indicates that the saw grinder A is operating automatically, and with a red automatic cycle "stop" indicator light 495 for indicating when the automatic cycle for grinding one saw blade 81 has been completed.

Figure 1:
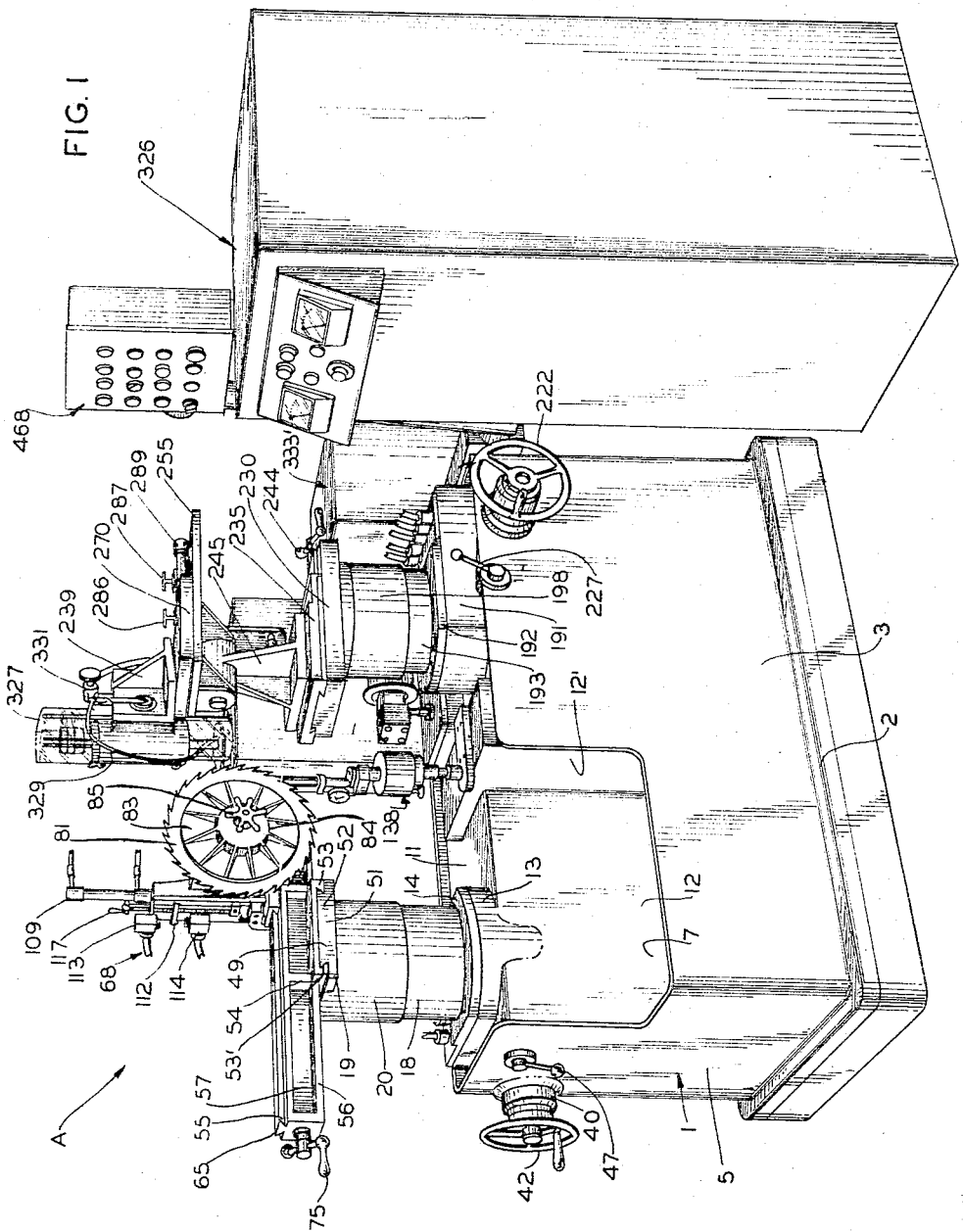
FIG. 1 is a perspective view of an automatic saw grinder constructed in accordance with and embodying the present invention and showing an electrolytic assist operatively connected thereto.

The control panel 468 is provided with a grinder advance push-button switch 496 for moving the longitudinally shiftable plate 270 and grinder wheel 309 toward the saw blade 81. The grinder advance push-button switch 496 includes a set of normally closed contacts 497, 498, a set of normally open contacts 499, 500, and a set of normally open contacts 501, 502. A grinder reset push-button switch 503 is mounted within the control panel 468 for returning the longitudinally shiftable plate 270 and grinder wheel 309 carried therewith to its "feed" position, that is, the position as shown in FIG. 1, and includes normally closed contacts 504, 505, normally open contacts 506, 507, and normally open contacts 508, 509.

A saw blade advance push-button switch 510 is mounted within the control panel 468 for advancing the various teeth of the saw blade 81 with respect to the grider wheel 309. The push-button switch 510 includes normally closed contacts 511, 512, normally open contacts 513, 514, normally closed contacts 515, 516, and normally open contacts 517, 518. A saw blade reset switch 519 is mounted within control panel 468 for resetting or advancing the saw blade 81 in a counter-clockwise direction, which direction is opposite to its normal or advancing direction of rotation. The push-button switch 519 includes normally closed contacts 520, 521, normally open contacts 522, 523, normally closed contacts 524, 525, and normally open contacts 526, 527.

An index reset push-button switch 528 is mounted within the control panel 468 and is adapted to actuate the index cylinder 141 and move the index finger 190 to a position where it is remote from the saw blade 81. The push-button switch 528 includes normally closed contacts 529, 530, and normally open contacts 531, 532. An index set push-button 533 is mounted within the control panel for actuating the indexing cylinder 141 and moving the index finger 190 to an "index" position, where it engages one of the teeth of the saw blade 81. The push-button switch 533 includes normally closed contacts 534, 535, and normally open contacts 536, 537. Also mounted within the control panel 468 is a continual blade advance push-button switch 538 for continually advancing the saw blade 81. The push-button switch 538 includes normally closed contacts 539, 540, and normally open contacts 541, 542.

The various limit switches, namely, limit switches 113, 114, 126, 277, and 278, are all electrically connected to the aforementioned relays and push-button switches as schematically shown in FIGS. 20a, 20b, 20c, and 20d. The limit switch 113 includes a blade 543 which is normally biased to a contact 544 and is movable to a contact 545. The blade 543 is also operatively, as well as electrically, connected to pivot-contact 546. The limit switch 114 includes a blade 547 which is normally biased to a contact 548 and is movable to a contact 549. The blade 547 is also connected to a pivot-contact 550. The cycle switch 133 includes a blade 551 which is normally biased to a contact 552 and is movable to a contact 553. The blade 551 is also operatively, as well as electrically, connected to a pivot-contact 554.

The limit switch 277, which regulates the forward movement of the grinder wheel 309 and of the longitudinally shiftable plate 270, includes a set of normally closed contacts 555, 556, and a set of normally open contacts 557, 558. The limit switch 278, which is adapted to regulate the return movement of the grinding wheel 309, includes a set of normally closed contacts 559, 560, and a set of normally open contacts 561, 562.

It can be seen that when the longitudinally shiftable plate 270 is in the grinding position and has completed a grinding stroke, the normally open contacts 557, 558, of the limit switch 277 will be closed and the normally closed contacts 555, 556, will be open. At this moment in the cycle, the normally closed contacts 559, 560, of the limit switch 278 will be closed, and the normally open contacts 561, 562, thereof will be open. Thereupon, the plate 270 will reverse its stroke. When the plate 270 has reversed its stroke and has returned to its starting position, the normally closed contacts 559, 560, of the limit switch 278 will open, and the normally open contacts 561, 562, thereof will close. Also, the normally open contacts 557, 558, of the limit switch 277 will be open again and the normally closed contacts 555, 556, thereof will return to closed position.

The electrical connections between the various components of the control panel 468, the various limit switches and relays are shown in four interrelated figures, namely, FIGS. 20a, 20b, 20c, and 20d. For purposes of simplifying this wiring diagram, these components have been schematically connected with diagrammatic elements 600 to 692, inclusive. The correlation between these various diagrammatic elements 600 to 690, inclusive, can be traced in FIGS. 20a, 20b, 20c, and 20d, according to the following table.

*Table I.—Correlation table for connector contacts*

| | |
|---|---|
| 600–692 | 647–626–660–679 |
| 601–691 | 648–613–668 |
| 602–690 | 649–610–674 |
| 603–628–685 | 650–609–673 |
| 604–603–686 | 651–661 |
| 605–689 | 652–658 |
| 606–688 | 653–623 |
| 607–687 | 654–616–662–680 |
| 608–604–686 | 655–646–619 |
| 609–650–673 | 656–638–614 |
| 610–649–674 | 657–682 |
| 611–670 | 658–652 |
| 612–645–671 | 659–620–631–681 |
| 613–648–668 | 660–626–647–679 |
| 614–638–656 | 661–651 |
| 615–641–665 | 662–616–654–680 |
| 616–654–662–680 | 663–632 |
| 617–684 | 664–622–640 |
| 618–642 | 665–641–615 |
| 619–646–655 | 666–621 |
| 620–631–659–681 | 667–635–683 |
| 621–666 | 668–613–648 |
| 622–640–664 | 669–643 |
| 623–653 | 670–611 |
| 624–644 | 671–612–645 |
| 625–639 | 672–636 |
| 626–647–660–679 | 673–609–650 |
| 628–603–685 | 674–610–649 |
| 629–678 | 675–633–637 |
| 630–676 | 676–630 |
| 631–620–659–681 | 677–634 |
| 632–663 | 678–629 |
| 633–675–637 | 679–626–660–647 |
| 634–677 | 680–616–654–662 |
| 635–683–667 | 681–620–631–659 |
| 636–672 | 682–657 |
| 637–675–633 | 683–635–667 |
| 638–614–656 | 684–617 |
| 639–625 | 685–603–628 |
| 640–622–664 | 686–604–608 |
| 641–615–665 | 687–607 |
| 642–618 | 688–606 |
| 643–669 | 689–605 |
| 644–624 | 690–602 |
| 645–612–671 | 691–601 |
| 646–619–655 | 692–600 |

By way of illustration, the above correlation table shows that diagrammatic element 614 of FIG. 20a is electrically common to diagrammatic element 638 of FIG. 20b. The lead wires shown as terminating in these diagrammatic elements 614, 638, are actually connected to each other. Similarly, diagrammatic element 626 of FIG. 20a is electrically common to diagrammatic element 647 of FIG. 20b, to the diagrammatic element 660 of FIG. 20c, and to diagrammatic element 679 of FIG. 20d. The lead wires shown as terminating in these diagrammatic elements 626, 647, 660, 679, are actually connected to each other.

In use, any conventional saw blade 81 can be disposed on the outer end of the mounting shaft 76 and secured by means of the locking nut 85. Moreover, if desired, the blade 81 can be secured between a pair of clamping plates 82, 83, to prevent buckling of the blade 81 during the grinding operation. This is particularly desirable in the case of blades of relatively small thickness. The saw blade 81 is next vertically positioned with respect to the grinding wheel 309 by rotation of the crank handle 42. The rotation of the crank handle 42 will rotate therewith the shaft 32, causing the pinion gear 31 to rotate the rack bar 24 and thus raise or lower the elevating column 18. After the correct elevation has been obtained, the locking bolt 46 is turned to bear against the shoe 48, which will, in turn, bear against the annular surface of the elevating column 18, holding the elevating column 18 in a rigid position.

Next, the longitudinal position of the saw blade 81 must be adjusted with respect to the grinding wheel 309 because of the various diametral sizes of the blades 81, normally sharpened on the saw grinder A. The crank handle 75 is rotated, thereby rotating the jack shaft 73. The link 72 will shift the position of the housing 69 with respect to the grinding wheel 309. After the housing 69 has been correctly positioned, on the guide block 65, it is rigidly secured thereto by tightening the various set screws 71. If needed, the position of the saw blade 81 can be adjusted laterally with respect to the grinding wheel 309 by shifting the lateral slide 54. After the slide 54 has been correctly positioned, the bolt 62 is tightened within the elongated slot 61, thereby holding the slide 54 in a rigid position. Usually, it is not necessary to adjust the lateral 54 with respect to the grinding wheel 309. It is usually only necessary to adjust the longitudinal position of the blade 81 and the vertical position thereof, in order to compensate for the various diametral sizes of the saw blades 81 used on the grinder A.

After the saw blade 81 has been correctly positioned, it is often desirable to adjust the height of the grinding wheel 309. This is accomplished by rotating the crank handle 222, which will rotate the shaft 213. The worm gear 212 on the shaft 213, which will rotate the worm wheel 211 on the shaft 210 and the pinion gear 209, will raise and lower the rack bar 202, and thereby elevate the elevating column 196. After the column 196 has been raised to a desired position, the locking bolt 226 is tightened to bear against the shoe 228, which will, in turn, bear against the annular surface of the elevating column 196, thereby holding the column 196 in a rigid position.

It is, of course, necessary to adjust the longitudinal position of the grinding wheel 309 with respect to the saw blade 81. This is accomplished by turning the crank handle 244 and thus the jack shaft 237. When the jack shaft 237 is rotated, it will move the finger 238 in contact with the slide 235 along the guide block 231. After the slide 235 is moved to a desired longitudinal position with respect to the saw blade 81, it can be rigidly secured to said position by means of the set screws s. It is possible to laterally position the grinding wheel 309 with respect to the saw blade 81 by means of the lateral slide 245. By releasing the bolts 250, the slide 245 can be shifted with respect to the grinding wheel 309 and then rigidly locked by tightening the bolts 250. This lateral adjustment is rarely used, and is provided merely to compensate for the relative thicknesses of the various saw blades 81 used on the saw grinder A.

It is often desirable to sharpen the teeth of the saw blades 81 to various degrees of tilt. This can be accomplished by loosening the bolt 264 and the locking nut 259 and tilting the support plate 255 to an angular position with respect to the shiftable slide 235. As the desired degree of tilt is obtained, as indicated on the tilt indicator plate 261, the bolt 264 is tightened, thus securing the support plate 265 in an angular position with respect to the longitudinally shiftable slide 235.

If desired, the electrolytic-assist 326 can be connected to the clamp 321 through conductors 325 and thus supply an electrical charge to the grinding wheel 309 for electrically grinding the saw blades 81. It can be seen that the grinding wheel 309 and the motor 316, which are mounted on the bracket 297, are completely insulated from the grinder A and, therefore, do not endanger the personnel operating the grinder A.

Upon proper response from the hydraulic control system 332, fluid will be supplied to the double acting hydraulic cylinder 290 and cause the piston 291 to move the T-shaped contact arm 276 and the longitudinally shiftable plate 270 toward the saw blade 81. When the leg portion 279 of the T-shaped arm 276 contacts the roller 280, causing the roller to swing downwardly, this will send an impulse from the limit switch 277 to the electrical control system 333, and then cause the hydraulic control system 332 to return fluid to the opposite port of the hydraulic cylinder 290. This will, of course, cause the piston 291 to retract and return the longitudinally shiftable plate to its "feed" position.

After the shiftable plate 270, which carries the grinding wheel 309, has returned from its "grinding" stroke to its initial or "feed" position the cylinders 120, 121, and pistons 122, 123, will be de-actuated and the vertically shiftable rack bar 104 will be caused to move downwardly by the extension of the piston rod 107. As this happens, the slip clutch 97 will be engaged, and the shaft 76 will rotate and thereby rotate and advance the saw blade 81 through and beyond the next grinding position.

When actuating arm 112 on rack bar 104 strikes lower limit switch 114, fluid is supplied to lower port 111 of cylinder 109 causing rack bar 104 to move upwardly and rotate blade 81 in the opposite direction. At the same time the indexing device 138 will be actuated. Accordingly, fluid will be supplied to the lower port 143 of the double acting acting hydraulic cylinder 141, causing the piston 144 to move up. As the piston 144 is moved upwardly, carrying the pivot support block 147, the driving link 162 will move upwardly and the annular shoulder 164 will abut the upper link casing 150 as described above. It can be seen by reference to FIG. 10 that, as the driving link 162 is tilted to the right, it pivots the entire jacket 173 and the follower link 169. This will cause the indexing finger 190 to move into the "indexing" position, where it will engage one of the teeth of the saw blade 81 as rack 104 moves upwardly and rotates blade 81 in the opposite direction. This will prevent further rotation of the saw blade 81. Moreover, it can be seen that it is possible to adjust the movement of the indexing device 138 by the adjusting bolt 177 and, therefore, regulate the depth of entry into the gullet between two adjacent teeth on the saw blade 81. The number of teeth by which the saw blade 81 advances during each indexing stroke can be regulated by adjusting the distance between the limit switches 113, 114.

After the rack bar 104 has reached its uppermost position and trips the limit switch 113, an electrical impulse will be sent to the electrical control system 333 and then to the hydraulic control system 332, causing fluid to be shut off to the double acting hydraulic cylinder 109, and locking the piston rod 106 in a rigid position. At the same time, the fluid will be supplied to the fluid ports 126 of the hydraulic cylinders 120, 121, causing the movable pistons 122, 123, to force the bearing plates 124, 125, into braking contact with the brake plate 94.

This will, of course, hold the saw blade 81 in a rigid position for the cutting operation. Moreover, as the rack bar 104 reaches its uppermost position and trips the limit switch 113, the impulse will cause fluid to be supplied to the upper port 142 of the hydraulic cylinder 141, causing the piston 144 thereof to move downwardly and also carrying therewith the pivot support block 147. This, of course, will carry the links 162 and 169. As the projection 167 of the link 162 abuts the annular shoulder 168, the driving link 162 will tilt to the left, withdrawing the finger 190 from engagement with the saw teeth.

In order to start the operation of the saw grinder A, the main switch 358 is closed, thereby, energizing lines $L^1$, $L^2$, $L^3$, and the secondary coil 357 of the transformer $t$, and thus lines 372, 373. By reference to FIG. 20b, it can be seen that as the secondary coil 357 becomes energized, the contacts 487, 486, 492, 493, 497, 498, 504, 505, 511, 512, 520, 521, 529, 530, 534, 535, 523, and 517, have all become energized.

Next, the switch 472 is turned to the "on" position, thereby closing contacts 473, 474 and 477, 478. In order to operate the pump 352, the push button 482 is closed, which will, in turn, close the contacts 483, 484. This will complete a circuit to the coil 457 of the relay 370, closing all of the normally open contacts thereof. By means of the above-outlined circuitry, it can be seen that the contacts 460, 461, are holding contacts, and when these contacts are closed, they will hold the relay 370 in an energized state. Moreover, as contacts 462, 463, 464, 465, 466, and 467 are closed, they will complete a circuit to a pump 352, thereby energizing the pump. It will also be noted that the switches 458, 459, are overload switches and will open, thereby preventing a burning up of the pump 362 in the event of a current overload.

The electric motor 316 is started by closing push button switch 469, and thus closing contacts 470, 471. The contact 470 is energized, since it is connected to contact 481 to normally closed contacts 480, 481, of switch 479 and then to contact 476 of push button 472. When the contacts 470, 471, are closed, current will be supplied directly to the coil 446 of the relay 369. As each of the contacts of this relay 369 close, the holding contact 449, 450, will hold the coil 446 in the energized state. Moreover, contacts 451, 452, 453, 454, 455, and 456, will close, thereby connecting the motor 316 directly to the high-powered lines $L^1$, $L^2$, $L^3$, for rotating the grinding wheel 309. It is to be noted that the overload switches 447, 448, will prevent an overload of current to the motor 316 in the manner as previously described with the overload switches 458, 459. In this connection, it should be noted that each coil of each of the relays 361–370 is grounded.

Before operating the saw grinder A automatically, it is necessary to reset the blade advance, the indexing device, and the grinder feed. Accordingly, the grinder feed reset switch, push button switch 503, is closed, thereby closing the normally open contacts 506, 507, and closing the normally open contacts 508, 509. At this point, it is to be noted that the closing of push button 503 will accomplish no completion of the circuit unless the longitudinally shiftable plate 270 is in any position except its "feed" position, that is the position where it is most remote from the saw blade 81. If the plate 270 and the grinding wheel 309 are in the "feed" position, the contacts 561, 562 will be closed and the contacts 559, 560 will be open. Thus, it can be seen that the contact 508 of the push button 503 will not be energized. However, if the contacts 559, 560, of the switch 273 are closed, a circuit is completed through the contacts 559, 560, of the limit switch 278, through the contacts 508, 509, now closed, of the push button switch 503, to the solenoid 337. This will position the control valve 335 so that fluid will be pumped into the double acting hydraulic cylinder 290 in order to retract the piston 291. As the piston 291 is retracted, the shiftable plate 270 will be moved to the "feed" position, where it will open contacts 559, 560, and close contacts 561, 562, of the limit switch 278. As the contacts 559, 560, are opened, power will be shut off to the contact 508 of the push button switch 503, thereby de-energizing the solenoid 337, and closing the control valve 335.

It is next necessary to rest the saw blade advancing mechanism. Accordingly, the saw blade rest switch, push button switch 519, is closed, thereby opening the normally closed contacts 520, 521, and closing the normally open contacts 522, 523. Moreover, the normally open contacts 526, 527, will also be closed. At this point, it is to be noted that the saw blade 81 will only need resetting if the rack bar 104 is located in any position except its uppermost position. If the saw blade 81 is not in need of resetting, it is to be noted that the rack bar would be located at its uppermost position and, therefore, the contacts 546, 544, of the limit switch 113 would be closed. In this event, the contact 545 of limit switch 113 would not be energized, and, therefore, a circuit could not be completed between contacts 526, 527 of push button 519. If, however, the rack bar 104 is located in any position except its uppermost position, the blade 543 of the limit switch 513 will close the contacts 546, 545, thereby energizing the contact 526 of the push button 519. As the contacts 526, 527, are now closed, current will flow to the solenoid 342, thereby positioning the control valve 340 to retract the piston 107 and raise the rack bar 104. As the rack bar 104 reaches its uppermost position, it will close contacts 546, 544, thereby breaking the circuit to contacts 526, 527 of push button 519.

In order to reset the indexing device 138, the index reset switch 533 is closed, thereby closing contacts 413, 414, and energizing the solenoid 396, which will, in turn, shift the valve 345 away from the position shown in FIG. 20a (i.e., to the oppositely ported position). This will allow fluid to flow under pressure to the fluid lower port 143 for extending the piston 144, which will move the index finger 190 away from the saw blade 81.

After all of the resetting operations have been completed, namely, the resetting of the grinder wheel 309, the resetting of the saw blade 81, and the resetting of the indexing device 138, it is then possible to automatically operate the saw grinder A. However, it is often necessary to adjust the various positions of the respective limit switches 113, 114, 277, and 278. This is accomplished after the longitudinal, the lateral position, and the vertical position of each saw blade 81 and the grinding wheel 309 have been established. The grinder advance switch, namely, push-button switch 496, will advance the grinding blade 309 to a position where it will engage one of the teeth of the saw blade 81. When it is desired to set the forwardmost limit of the limit switch 277, it is desirable to advance the longitudinally shiftable plate 270 in the grinding wheel 309 to their "grinding" position. Thus, the limit switch 277 is positioned where the T-shaped contact arm 276 engages the contact roller 280, when the grinding wheel 309 engages the saw blade 81. It is to be noted that in order to operate the push-button switch 496, the contacts 555, 556, of the limit switch 277 must be closed. This means that the grinding wheel 309 is in any position except the "grinding" position. Thus, when the push button 496 is closed, it will close contact 499, 500. It is also to be noted that contact 555 of limit switch 277 is energized since it is connected to contact 544 of limit switch 113, which is, in turn, connected to contact 546. As contacts 555, 556, of limit switch 277 are closed, current will be transmitted through the now closed contacts 499, 500, to the solenoid 336, thereby causing the control valve 335 to allow fluid flow to the cylinder 290 to extend the piston 291. This will move the shiftable plate 270 and the grinding wheel 309 to the "grinding" position. When the grinding wheel reaches the "grinding" position, it will close contacts 557, 558, and thereby open contacts 555, 556, of limit switch 277. This will immediately shut off the flow of current between the now closed contacts 499, 500, and then to the solenoid 336. Accordingly, the control valve 335 will close and stop the movement of the piston 291. After the grinding wheel 309 has been moved to its "grinding" position, the limit switch 277 can be positioned. After this has been accomplished, the grinding wheel 309 can be returned by use of the grinder feed reset switch, push button 503, in the manner as previously described.

In order to determine respective positions of the limit switches 113, 114, it is necessary to advance the saw blade 81 to determine the amount of advance during the movement of the rack bar 104. This is accomplished by closing the saw blade advance switch, push button switch 510, thereby closing normally open contacts 513, 514. Moreover, normally open contacts 517, 518, will also be closed. It is to be noted that in order to complete a circuit through push button 510, it is necessary that the rack bar 104 be located in any position but its lowermost position, so that contacts 548, 549, will be closed. When the contacts 513, 514, of the push button switch 510 are closed, current will be transmitted from the contacts 548, 549, of limit switch 114, to the now closed contacts 513, 514, of the saw blade advance switch 510, and to the solenoid 341. As the solenoid is actuated, the control valve 340 will permit fluid to flow through the port 110, thereby extending the piston 107 and lowering the rack bar 104. As the rack bar 104 reaches its lowermost position, it will close contacts 549, 550, and thereby open contacts 548, 549. This will immediately de-energize the closed contacts 513, 514, preventing further downward movement of the rack bar 104. In order to raise the rack bar 104 and rotate the saw blade 81 in the opposite direction, the saw blade reset switch is closed, namely, push button switch 519. The rack bar 104 will raise in the manner previously described.

When preparing the saw grinder A for automatic operation, it is also necessary to correctly position and adjust the indexing device 138, in order to determine the degree of movement of the indexing finger 190. Thus, the push button switch 533 is closed, thereby closing the contacts 536, 537, for providing a direct line of current to the solenoid 346. This will, in turn, actuate the control valve 345, permitting fluid to flow through the port 143 to the retracted piston 144, and thereby move the finger 190 into the "indexing" position. In order to return the finger 190 to its retracted position, it is merely necessary to close the push button switch 528 in the manner previously described.

After the grinding wheel 309 has been reset to its "feed" position and after the saw blade advancing mechanism has been reset and after the indexing device 138 has been reset, it is possible to operate the saw grinder A automatically on an automatic cycle. At this point, it should be noted that as the grinding wheel 309 is in its "feed" position, the contacts 561, 562, of the limit switch 278 will be closed, and the contacts 559, 560, thereof will be opened. Moreover, the normally closed contacts 555, 556, of the limit switch 277 will be closed and the normally open contacts 557, 558, thereof will be opened. As the push button switch 488 is closed, contacts 489, 490, will close. It is to be noted that contact 489 will be electrically energized as it is connected to contacts 556, 555, of limit switch 277 and to contact 546, through contact 544 of limit switch 113. The current will thereupon flow through the closed contacts 489, 490, through normally closed contacts 539, 540, of push button switch 538, through normally closed contacts 399, 400, of relay 363, through normally closed contacts 415, 416, of relay 365, through normally closed contacts 424, 425, of relay 366, and to the coil 374 of relay 361. The circuit is completed as the other terminal of the coil 374 is grounded. As a result thereof, the contacts 375, 376, 377, 378, 379, 380, 381, 382, will all close. By means of the above-outlined circuitry, it can be seen that contacts 375, 376, are holding contacts and will hold the coil 374 in the energized state.

As the contacts 377, 378, of relay 361 are closed, this will complete a circuit to the coil 383 of relay 362, thereby closing all of the normally open contacts of relay 362. It can be seen that contacts 384, 385, which are now closed, will hold the coil 383 in an energized state, as these contacts serve as holding contacts. The closing of contacts 388, 389, of relay 362 will complete a circuit to and light the automatic run light 494. The closing of contacts 379, 380, of relay 361 completed a circuit to the solenoid 336, thereby shifting the control valve 335 from closed to open position to permit fluid to flow into the double acting hydraulic cylinder 290 and extend the piston rod 291. This, of course, moved the longitudinally shiftable plate 270, carrying the grinding wheel 309 to its "grinding" position. At the same time, the closing of contacts 381, 382, completed a circuit to the solenoid 347 and shifted the control valve 345 back to the position shown in FIG. 20a, thereby admitting hydraulic fluid to the upper port 142 and retracting the piston rod 144. This, of course, will insure that the indexing finger 190 is not in the indexing position at the beginning of the grinding stroke. Meanwhile, the contacts 386, 387, of relay 362 close, completing a circuit through normally closed contacts 417, 418, of relay 365, through normally closed contacts 429, 428, of relay 366, to the solenoid 351, and thereby shifting the control valve 350 away from the position shown in FIG. 20a (i.e., to the oppositely ported position). This will permit the fluid to flow under pressure into each of the cylinders 120, 121, for extending the piston rods 123, 124, which will, in turn, hold the saw blade 81 securely and precisely in indexed position, all in the manner as previously described.

When the longitudinal shifting plate 270 has reached its forward-most position where the grinding wheel 309 is in the "grinding" position, the T-shaped contact arm 276 will engage the contact roller 286 and close the normally open contacts 557, 558, of the switch 277. Similarly, the normally closed contacts 555, 556, thereof will open. It should also be noted that when the plate 270 left its "feed" position, the contact arm 276 permitted the normally closed contacts 559, 560, of the limit switch 278 to close. As a result thereof, a circuit is completed through contacts 559, 560, of limit switch 278, through the now closed contacts 390, 391, of relay 362, through the normally closed contacts 420, 421, of the relay 365, to the coil 394 of the relay 363. When the coil 394 becomes energized, normally open contacts 395, 396, 397, 398, 401, 402 will close. It can be seen that the contacts 401, 402, served as holding contacts to hold the coil 394 in its energized state. Moreover, normally closed contacts 399, 400, opened.

At the same time that the relay 363 was energized, the contacts 555, 556, of the limit switch 277 opened when the plate 270 reached its "feed" position. It can thus be seen that this broke the electrical circuit to the solenoid 374 of the relay 361, and thereby de-energized the relay 361, permitting all of its normally open contacts to open. This, of course, will break the circuit to the solenoid 336, thereby closing the control valve 335 and stopping the forward movement of the grinding wheel 309.

When the contacts 397, 398, of the relay 363 closed, they completed a circuit to the solenoid 377, thereby opening the control valve 335, permitting fluid to flow into the double acting hydraulic cylinder 290 to retract the piston 291. This caused the longitudinally shiftable plate 270, carrying the grinding wheel 309, to move rearwardly to the "feed" position, and withdrew the grinding wheel 309 from engagement with the teeth of the saw blade 81 after the operation has been completed.

After the longitudinally shiftable plate 270 has completed its return stroke, the various indexing and blade advancing operations take place.

The closing of contacts 395, 396, of the relay 363, completed a circuit through the normally closed contacts 422, 423, of the relay 366, and energized the coil 403 of the relay 364. This closed the normally open contacts 404, 405, 406, and 407 thereof. The closing of contacts 406, 407, of the relay 364, completed a circuit through normally closed contacts 433, 432, of the relay 366, to the coil 408 of the relay 365, thereby energizing the relay 365. It is, of course, obvious that when this happens, the normally open contacts 409, 410, 411, 412, 413, 414, closed, and the normally closed contacts 415, 416, 417, 418, opened. At this point, it is to be noted that the contacts 404, 405, are holding contacts and serve to hold the coil 403 in an energized state as long as the contacts 395, 396, of the relay 363, remain closed. Moreover, it is to be noted that the contacts 409, 410, of the relay 365, are holding contacts and will serve to hold the coil 408 of the relay 365 in an energized state.

The closing of contacts 411, 412, of the relay 365 completed a circuit to the solenoid 341, thereby opening the control valve 340 and permitting fluid to flow into the port 110 of the cylinder 109 for extending the piston 107. This will, of course, lower the rack bar 104. At the same time that this happens, the closing of the contacts 413, 414, of the relay 365 completed a circuit to the solenoid 346, thereby shifting the control valve 345 away from the position shown in FIG. 20a, thus permitting fluid to flow under pressure into the port 143 of the hydraulic cylinder 141 for extending the piston 144. The extension of the piston 144 will move the indexing finger 190 to the "index" position, all in the manner as previously described. The opening of the normally closed contacts 417, 418, of the relay 365 will de-energize the solenoid 351 for opening the control valve 350. This will permit the pistons 122, 123, to withdraw and thereby release the holding or so-called braking action on the shaft 76. Thus, it can be seen that as the braking pistons 122, 123, are retracted, they will release the braking action against the shaft 76, permitting rotation thereof. Therefore, as the rack bar 104 is moving downwardly, it will advance the saw blade 81.

When the rack bar 104 reaches its lowermost position, it will break the contacts 548, 549, of the limit switch 114 and close the normally open contacts 547, 550, thereof. It should be noted at this point that when the contacts 546, 544, of the limit switch 113 were broke, which occurred when the rack bar 104 left its uppermost position, that the relay 361 could not be energized until the rack bar 104 again reached its uppermost position, thereby closing contacts 544, 546, of limit switch 113. When the grinding wheel 309 reaches its rearwardmost or "feed" position, the contacts 559, 560, of limit switch 278 will be broken and the contacts 561, 562, thereof, will close. By following the circuitry, it can be seen that the closing of contacts 561, 562, of limit switch 278 will break the circuit to coil 394 of relay 363, thereby de-energizing the relay 363. Therefore, at this point only the relays 362, 364, and 365, are energized. It can also be seen that the relay 365 will be de-energized if either of the contacts 561, 562, of limit switch 278 or if either of the contacts 548, 549, of limit switch 114 are broken. It can be seen that since contacts 548, 550, of the limit switch 114 are opened when the rack bar 104 reaches its lower most position, that the relay 365 will be de-energized. However, when the contacts 549, 550, of limit switch 114 were closed, a circuit was completed to the coil 419 of the relay 366, thereby energizing the relay 366. This will, in turn, open normally closed contacts 420, 421, 422, 423, 424, 425, 426, 427, and 428, 429. Moreover, normally open contacts 430, 431, will close, normally open contacts 434, 435, will close, and normally closed contacts 432, 433, will open. By means of the above-outlined circuitry, it can be seen that contacts 434, 435, serve as holding contacts and, therefore, will hold the coil 419 in an energized state.

When contacts 422, 423, of delay 366 opened, this broke the circuit in the coil 403 of relay 364. Similarly, when contacts 432, 433, of relay 366 opened, the circuit to the coil 408 of relay 365 was broke thereby de-energizing the entire relay 365. When the grinding wheel 309 reaches its rearwardmost or "feed" position, the contacts 559, 560, of limit switch 278 will open and the contacts 561, 562, will close, pulling in relay 365 and will thereby initiate the next indexing cycle. It will be noted that when relay 365 is energized, contacts 415, 416, will open, breaking the circuit to the solenoid 374 of relay 361 so that this latter relay cannot unauthorizedly close. This will, of course, prevent the grinding wheel 309 from moving forward during the indexing cycle. As the normally open contacts 430, 431, of relay 366 close, a circuit is completed to the solenoid 342, causing the rack bar 104 to raise. At this point, it should still be noted that the pistons 122, 123, of the braking cylinders 120, 121, are in the retracted position and thereby do not hold the shaft 76 in a rigid position. However, as the indexing finger 190 is moved to the "indexing" position, this will prevent the saw blade 81 from advancing, and the shaft 76 will slip through the slip clutch 97.

During the upward movement of the rack bar 104, the contacts 549, 550, of limit switch 114 were broke and the contacts 548, 549, thereof were closed. When the rack bar 104 reaches its uppermost limit of travel, it will open contacts 545, 546, of limit switch 113 and close contacts 544, 546, thereof. Since the contact 545 of limit switch 113 is no longer energized through contact 546, it can be seen that current will no longer pass through contacts 435, 434, of relay 366 and thereby will de-energize the coil 419. This, of course, will de-energize the entire relay 366. When the relay 366 is de-energized, it can be seen that the normally closed contacts 426, 427, will close, thereby completing a circuit through contacts 386, 387, of relay 362, through normally closed contacts 417, 418, of relay 365, through normally closed contacts 428, 429, of relay 366, to the solenoid 351, thereby opening the control valve 350 for permitting the extension of the pistons 122, 123. This will, of course, hold the shaft 76 in a rigid position, preventing the rotation of the saw blade 81.

Since the rack bar 104 has reached its uppermost position, the contacts 546, 544, of the limit switch 113 are now closed, and since the grinding wheel 309 is in its "feed" position, the contacts 561, 562, of limit switch 278 and the contacts 555, 556, of limit switch 277 are closed. When the relay 366 was de-energized, the normally closed contacts 426, 427, thereof, closed and thereby energized coil 436 of relay 367. This, of course, closed the contacts 437, 438, of relay 367, and as the contacts 439, 440, thereof, are "time-delay" contacts, they will stay closed for an instant and open shortly thereafter. However, during the time they are closed a pulse will be sent through contacts 392, 393, of relay 362, through the normally closed contacts 539, 540, of push button 538, through the normally closed contacts 399, 400, of relay 363, through the normally closed contacts 415, 416, of relay 365, through the normally closed contacts 424, 425, of relay 366, to the coil 374 of relay 361, thereby energizing the relay 361. The holding contacts 375, 376, of relay 361 will close, thereby holding this entire relay in an energized state. As the contacts 381, 382, of relay 361 are now closed, this will complete a circuit to solenoid 347 for withdrawing the indexing finger 190. At the same time, the contacts 379, 380, will close, completing a circuit to the solenoid 386 for moving the grinding wheel 309 toward the "grinding" position. Relay 367 will essentially de-energize itself, since the contacts 439, 440, are time-delay contacts. Thus, it can be seen that the entire automatic cycle is completed in the manner as previously described, and, after the next tooth of the saw blade 81 has been advanced, the grinding wheel 309 will move forward for sharpening the next advanced tooth. On the return movement of the grinding wheel 309, the braking cylinders 120, 121, will be deactuated and the rack 104 will be moved downwardly. After the next tooth has been advanced through and beyond indexed position, the indexing finger 190 will be moved to the "indexing" position and the rack bar 104 will raise, bringing the tooth back to indexed position against the indexing finger 190. Finally, the brake cylinders 120, 121, will lock up and thereupon the indexing finger 190 will be withdrawn to the retracted position. This entire process is completed until all of the teeth on the saw blade 81 have been sharpened.

After the saw blade 81 has advanced one complete revolution, the arm 127 of the switch 126 will open the normally closed contacts 552, 553, of the limit switch 126 and will close the normally open contacts 553, 554, thereof. As this occurs, a circuit will be completed to and light the red light button 495 for indicating that the automatic cycle has been completed. Moreover, a circuit will be completed to the coil 441 of relay 368, thereby energizing this relay. However, the contacts 444, 445, of relay 368 are time-delay contacts and will remain open for an instant. As this happens, the current through the contacts 552, 553, of limit switch 156 will be severed, thereby preventing the flow of current to the contacts 377, 378, of relay 361. Moreover, this will prevent a continual flow of current to the contacts 384, 385, of relay 362, and to the coil 383 of relay 362. This, of course, will de-energize the coil 383 and open the holding contacts 384, 385, for the de-energization of the entire relay 362. In this connection, it should be noted that the arm 127 of the limit switch 126 is so adjusted that the contacts 552, 553, will be broken before the relay 361 is energized to start a new cycle. As the relay 362 is now open, it is impossible for the relay 361 to again be energized unless the push button switch 488 is closed. It can be seen that since the contacts 392, 393, of relay 362 are opened, and the contacts 375, 376, of relay 361 are opened, it is impossible to energize the coils 374, 361, without closing push button switch 488 to start a new cycle. For example, current is normally supplied to the coil 374 of relay 361 through the normally closed contacts 424, 425, of relay 366, through the normally closed contacts 415, 416, of relay 365, through the normally closed contacts 399, 400, of relay 363, through the normally closed contacts 539, 540, of push button 538, and to contacts 375, 376, of relay 361. Thus, since the coil 374 of relay 361 is de-energized, current will not pass through contacts 375, 376, the holding contacts.

After the entire blade 81 has been completely sharpened, it is removed in the manner as previously described and the new blade 81 is mounted on the shaft 76. After the entire adjusting operation is completed as previously described, a new cycle can then be started by closing push button switch 488. As soon as the cycle is again started the arm 127 of limit switch 126 will permit the contacts 552, 553, to close, thereby opening contacts 553, 554, of switch 126. This will, of course, open the circuit to the red light 495, and will de-energize relay 368. Thus, as contacts 552, 553, are closed, it can be seen that the relay 362 can be energized in the cycle as previously described.

It is oftentimes necessary to continually advance the saw blade 81 on the shaft 76, mainly for purposes of finding a starting point on the saw blade or for adjusting the various limit switches of the grinder A. In order to continually advance the blade 81, it is necessary that the grinding wheel 309 be located in its rearwardmost position, so that the contacts 561, 562, of limit switch 278 are closed. Moreover, it is important that the rack bar 104 be located in any position except its lowermost position so that contacts 548, 549, of limit switch 114 are closed. Current will then be supplied from the closed contacts 548, 549, of limit switch 114 through the now closed contacts 561, 562, of limit switch 278, to the contact 541 of push button switch 538. When the push button switch 538 is closed, current is transmitted through the closed contacts 541, 542, through the normally closed contacts 432, 433, of relay 366, to the coil 408 of relay 365. This will, in turn, close contacts 411, 412, completing a circuit to the solenoid 341 for opening the control valve 340. This will permit fluid to flow into the port 110 of the double acting hydraulic cylinder 109 for extending the piston rod 107 and thereby lowering the rack bar 104. At the same time, contacts 413, 414, of relay 365 will close completing a circuit to solenoid 346 for moving the indexing finger 190 toward the indexing position. It is to be noted that as the rack bar 104 is moving downwardly, the contacts 544, 546, of limit switch 113 will open, and the contacts 545, 546, of limit switch 113 will close. Moreover, as the rack bar 104 reaches its lowermost position, it will close contacts 549, 550, of limit switch 114, and open the contacts 548, 550. This will immediately shut off the flow of current to the coil 408 of relay 365.

Now, as contacts 549, 550, of limit switch 114 are closed, current will be supplied through the normally closed contacts 515, 516, of push button switch 510, to the coil 419 of relay 366. As this occurs, the normally open contacts 430, 431, will close, completing a circuit to the solenoid 342 for raising the rack bar 104 in the manner as described. It is to be noted that the braking cylinders 120, 121, have not been actuated. Therefore, as the rack bar 104 raises, it will rotate the saw blade 81 in a counterclockwise direction, and the beveled edges of the teeth will continually push the indexing finger 190 out of the way against the action of the spring 178. When the rack bar 104 reaches its uppermost position, the contacts 549, 550, of limit switch 114 will close, and the contacts 546, 544, of limit switch 113 will close. The breaking of the contacts 545, 546, of limit switch 113 will, in turn, prevent the flow of current to the coil 419 of relay 366, thereby de-energizing the relay 366. As this occurs, this will, in turn, open the normally open contacts 430, 431, for de-energizing the solenoid 340 and stopping the movement of the rack bar 104.

After the rack bar 104 has reached its uppermost position, the new cycle will immediately be started as long as the push button switch 538 is closed. The coil 408 of the relay 365 will be energized in the manner as previously described, for energizing the solenoid 341. Thereupon, the rack bar 104 will have moved downwardly. As this occurs, the beveled edges of the saw blade 81 will continually urge the indexing finger 190 away as previously described so that the saw blade 81 can rotate. However, when the rack bar 104 is moved upwardly, the indexing finger 190 will hold the blade 81 in a fairly rigid position, and thereby act as a pall or ratchet. When it is desired to stop the continual advancing, it is merely necessary to open the push button switch 538. However, when it is desired to remove the indexing finger 190, it is necessary to close push button switch 528, which will actuate solenoid 347 in the manner as previously described.

An "emergency stop" push button switch 485 is provided for shutting off the current to the entire electrical circuitry 333 in the event of an emergency. It can be seen that this switch is interposed directly across the secondary lines 372, 373, and thereby will shut off current to all of the relays and push button switches, when the normally closed contacts 486, 487, are opened. The "off" push button switch 479 will open the contacts 480, 481, when the switch 479 is closed, and since the contact 481 is connected to the contact 450, of relay 369, which is, in turn, electrically connected to the coil 446 of this relay, it can be seen that the relay 369 will be de-energized for shutting off the flow of current to the motor 316. Similarly, contact 480 is connected to the coil 457 of relay 370, and de-energization thereof will de-energize the coil 457, shutting off the flow of current to the pump-motor combination 352.

The cycle-stop push button switch 491 will break the contacts 492, 493, thereby shutting off the flow of current to push button switches 496, 503, 510, 519, 526, and 533. This will, in turn, complete a circuit to all of the aforementioned relay coils and thereby step the entire automatic cycle of the saw grinder A.

It should be understood that changes and modifications in the form, construction, arrangement, and combination of the several parts of the automatic grinders may be made and substituted for those herein shown and described without departing from the nature and principle of our invention.

Having thus described our invention, what we claim and desire to secure by Letters Patent is:

1. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, and advancing means carried by the base means and being operatively connected to said blade-holding means for rotating said saw blade after each operative contact between the saw blade and grinding means.

2. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means opertaively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said griding zone for positioning each tooth of a saw blade with respect to the grinding means so that the grinding zone can be brought into contact with the saw blade, advancing means carried by the base means and being connected to said blade-holding means for rotating said saw blade after each operative contact between the saw blade and grinding means, and means operatively connecting said advancing means and said indexing means so that said advancing means will operate in pretimed relationship to said indexing means.

3. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment and including means for longitudinally positioning said blade-holding means with respect to said grinding zone, indexing means operatively mounted on said base means and being operatively located proximate to said grinding zone for positioning each tooth of a saw blade with respect to the grinding zone so that the grinding means can be brought into operative contact with the saw blade, and advancing means carried by the base means and being operatively connected to said blade-holding means for rotating said saw blade after each operative contact between the saw blade and grinding means.

4. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment and including means for longitudinally and laterally positioning said blade-holding means with respect to said grinding zone, indexing means operatively mounted on said base means and being operatively located proximate to said grinding zone for positioning each tooth of a saw blade with respect to the grinding zone so that the grinding means can be brought into operative contact with the saw blade, and advancing means carried by the base means and being operatively connected to said blade-holding means for rotating said saw blade after each operative contact between the saw blade and grinding means.

5. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment and including means for longitudinally and laterally positioning said blade-holding means with respect to said grinding zone, means for vertically positioning said blade-holding means with respect to said grinding zone, indexing means operatively mounted on said base means and being operatively located proximate to said grinding zone for positioning each tooth of a saw blade with respect to the grinding zone so that the grinding means can be brought into operative contact with the saw blade, and advancing means carried by the base means and being operatively connected to said blade-holding means for rotating said saw blade after each operative contact between the saw blade and grinding means.

6. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, feeding means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, the feeding means bringing said grinding means into contact with each tooth of a saw blade held by said blade-holding means, indexing means operatively mounted on said base means and being operatively located proximate to said grinding zone for positioning each tooth of a saw blade with respect to the grinding zone so that the grinding means can be brought into operative contact with the saw blade, and advancing means carried by the base means and being operatively connected to said blade-holding means for rotating said saw blade after each operative contact between the saw blade and grinding means.

7. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, the power-actuated means bringing said grinding means into contact with each tooth of a saw blade held by said blade-holding means, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, and means operatively connected to the indexing means, advancing means and feed means to operate said indexing means, advancing means and feeding means in pretimed relationship to each other.

8. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, feeding means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, the feeding means bringing said grinding means into operative contact with each tooth of a saw blade held by said blade-holding means, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first control means operatively connected to said indexing means and said advancing means for causing said indexing means to position a tooth of the saw blade after said advancing means has advanced said tooth of the saw blade, and second control means operatively connected to said indexing means and to said feeding means for causing said feeding means to bring said grinding means into contact with said last-named saw blade tooth after it has been correctly positioned.

9. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the saw blade and grinding means, and regulatory means operatively associated with said advancing means for regulating the degree of advancement of said saw blade.

10. A grinding device for saw blades and the like, said device comprising base means, first and second elevating pedestal means operatively mounted on said base means in spaced relation so as to define a grinding zone therebetween, compound slide means operatively mounted on said first elevating pedestal means and being adapted to shift laterally and longitudinally with respect to said base means, blade-holding means operatively mounted on said compound slide means and being adapted for releasably engaging and holding a saw blade upon said last-named slide means, a unidirectional slide means operatively mounted on the second elevating pedestal means for positional adjustment toward and away from the grinding zone, a reciprocating slide mounted on the unidirectional slide means, power actuated means for shifting the reciprocating slide toward and away from the grinding zone, grinding means operatively mounted on said reciprocating slide, indexing means operatively mounted on said base means and being operatively located proximate to said grinding zone for positioning each tooth of a saw blade with respect to the grinding zone so that the grinding means can be brought into contact with each said tooth when it is so positioned, and advancing means carried by the base means and being operatively connected to said blade-holding means for rotating said saw blade after each operative contact between the blade and grinding means.

11. A grinding device for saw blades and the like, said device comprising base means, first and second elevating pedestal means operatively mounted on said base means in spaced relation so as to define a grinding zone therebetween, lateral slide means operatively mounted on said first elevating pedestal means and being adapted to shift laterally with respect to said base means, longitudinal slide means operatively mounted on said lateral slide means and being adapted to shift longitudinally with respect to said base means, blade-holding means operatively mounted on said longitudinal slide means and being adapted for releasably engaging and holding a saw blade upon said last-named slide means, a unidirectional slide means operatively mounted on the second elevating pedestal means for positional adjustment toward and away from the grinding zone, a reciprocating slide mounted on the unidirectional slide means, power actuated means for shifting the reciprocating slide toward and away from the grinding zone, grinding means operatively mounted on said reciprocating slide, indexing means operatively mounted on said base means and being operatively located proximate to said grinding zone for positioning each tooth of a saw blade with respect to the grinding zone so that the grinding means can be brought into contact with each said tooth when it is so positioned, and advancing means carried by the base means and being operatively connected to said blade-holding means for rotating said saw blade after each operative contact between the blade and grinding means.

12. A grinding device for saw blades and the like, said device comprising base means, first and second elevating pedestal means operatively mounted on said base means in spaced relation so as to define a grinding zone therebetween, first compound slide means operatively mounted on said first elevating pedestal means and being adapted to shift laterally and longitudinally with respect to said base means, blade-holding means operatively mounted on said first compound slide means and being adapted for releasably engaging and holding a saw blade upon said first compound slide means, second compound slide means operatively mounted on said second elevating pedestal means and being adapted to shift laterally and longitudinally with respect to said base means, a reciprocating slide operatively mounted on the second compound slide means, power actuated means for shifting the reciprocating slide toward and away from the grinding zone, grinding means operatively mounted on said second compound slide means, indexing means operatively mounted on said base means and being operatively located proximate to said grinding zone for positioning each tooth of a saw blade with respect to the grinding zone so that the grinding means can be brought into contact with the saw blade, and advancing means carried by the base means and being operatively connected to said blade-holding means for rotating said saw blade after each operative contact between the blade and grinding means.

13. A grinding device for saw blades and the like, said device comprising base means, first and second elevating pedestal means operatively mounted on said base means in spaced relation so as to define a grinding zone therebetween, lateral slide means operatively mounted on said first elevating pedestal means and being adapted to shift laterally with respect to said base means, first longitudinal slide means operatively mounted on said lateral slide means and being adapted to shift longitudinally with respect to said base means, blade-holding means operatively mounted on said first longitudinal slide means and being adapted for releasably engaging and holding a saw blade upon said first longitudinal slide means, second longitudinal slide means operatively mounted on said second elevating pedestal means and being adapted to shift laterally and longitudinally with respect to said base means, a reciprocating slide operatively mounted on the second longitudinal slide means, power actuated means for shifting the reciprocating slide toward and away from the grinding zone, grinding means operatively mounted on said second longitudinal slide means, indexing means operatively mounted on said base means and being operatively located proximate to said grinding zone for positioning each tooth of a saw blade with respect to the grinding zone so that the grinding means can be brought into contact with the saw blade, and advancing means carried by the base means and being operatively connected to said blade-holding means for rotating said saw blade after each operative contact between the blade and grinding means.

14. A grinding device for saw blades and the like, said device comprising base means, first and second elevating pedestal means operatively mounted on said base means in spaced relation so as to define a grinding zone therebetween, first lateral slide means operatively mounted on said first elevating pedestal means and being adapted to shift laterally with respect to said base means, first longitudinal slide means operatively mounted on said first lateral slide means and being adapted to shift longitudinally with respect to said base means, blade-holding means operatively mounted on said first longitudinal slide means and being adapted for releasably engaging and holding a saw blade upon said first longitudinal slide means, second longitudinal slide means operatively mounted on said second elevating pedestal means and being adapted to shift longitudinally with respect to said base means, second lateral slide means operatively mounted on said second longitudinal slide means and being adapted to shift laterally with respect to said base means, a reciprocating slide operatively mounted on the second longitudinal slide means, power actuated means for shifting the reciprocating slide toward and away from the grinding zone, grinding means operatively mounted on said second lateral slide means, indexing means operatively mounted on said base means and being operatively located proximate to said grinding zone for positioning each tooth of a saw blade with respect to the grinding zone so that the grinding means can be brought into contact with the saw blade, and advancing means carried by the base means and being operatively connected to said blade-holding means for rotating said saw blade after each operative contact between the blade and grinding means.

15. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, and first power means operatively connected to said advancing means for causing said advancing means to rotate said saw blade after the grinding of each tooth thereof.

16. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first power means operatively connected to said advancing means for causing said advancing means to rotate said saw blade after the grinding of each tooth thereof, and second power means operatively connected to said indexing means for actuating said indexing means in pretimed relationship to said advancing means, whereby said indexing means will position a tooth on the saw blade after said advancing means has advanced the saw blade.

17. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first power means operatively connected to said advancing means for causing said advancing means to rotate said saw blade after the grinding of each tooth thereof, and second power means operatively connected to said indexing means for actuating said indexing means in pretimed relationship to said advancing means, whereby said indexing means will position a tooth on the saw blade after said advancing means has advanced the saw blade, the power-actuated means being operatively connected to said grinding means and said first and second power means for moving said grinding means toward and away from said saw blade after said blade has been indexed.

18. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first power means operatively connected to said advancing means for causing said advancing means to rotate said saw blade after the grinding of each tooth thereof, second power means operatively connected to and being operable in pretimed relationship to said first power means for holding said blade in a rigid position after it has been advanced, and third power means operatively connected to said indexing means for actuating said indexing means in pretimed relationship to said advancing means, whereby said indexing means will position a tooth on the saw blade after said advancing means has advanced the saw blade, the power-actuated means being operatively connected to said grinding means and said first and third power means for moving said grinding means toward and away from said saw blade after said blade has been indexed.

19. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first hydraulic ram means operatively connected to said advancing means for causing said advancing means to rotate said saw blade after the grinding of each tooth thereof, and second hydraulic ram means operatively connected to said indexing means for actuating said indexing means in pretimed relationship to said advancing means, whereby said indexing means will position a tooth on the saw blade after said advancing means has advanced the saw blade, the power-actuated means comprising third hydraulic ram means operatively connected to said grinding means and first and second hydraulic ram means for moving said grinding means toward and away from said saw blade after said blade has been indexed.

20. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, advancing means carried by the base means and being operatively connected to said blade-holding means for rotating said saw blade after each operative contact between the blade and grinding means, first hydraulic ram means operatively connected to said advancing means for causing said advancing means to rotate said saw blade after the grinding of each tooth thereof, first adjusting means operatively connected to said first hydraulic ram means for regulating the amount of advance of the saw blade caused by the advancing means, second hydraulic ram means operatively connected to said indexing means for actuating said indexing means in pretimed relationship to said advancing means, and second adjusting means operatively connected to said indexing means for adjusting the position of said indexing means, whereby said indexing means will position a tooth on the saw blade after said advancing means has advanced the saw blade, the power-actuated means comprising third hydraulic ram means operatively connected to said grinding means and said first and second hydraulic ram means for moving said grinding means toward and away from said saw blade after said blade has been indexed.

21. A grinding device for saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding means so that the grinding zone can be brought into contact with the saw blade, advancing means carried by the base means and being operatively connected to said blade-holding means for rotating said saw blade after each operative contact between the blade and grinding means, first hydraulic ram means operatively connected to said advancing means for causing said advancing means to rotate said saw blade after the grinding of each tooth thereof, first adjusting means operatively connected to said first hydraulic ram means for regulating the amount of advance of the saw blade caused by the advancing means, second hydraulic ram means operatively connected to and being operable in pretimed relationship to said first hydraulic ram means for holding said blade in a rigid position after it has been advanced, third hydraulic ram means operatively connected to said indexing means for actuating said indexing means in pretimed relationship to said advancing means, second adjusting means operatively connected to said indexing means for adjusting the position of said indexing means, whereby said indexing means will position a tooth on the saw blade after said advancing means has advanced the saw blade, the power-actuated means comprising fourth hydraulic ram means operatively connected to said grinding means and said first and third hydraulic ram means for moving said grinding means toward and away from said saw blade after said blade has been indexed, and third adjusting means operatively connected to said fourth hydraulic ram means for regulating the movement of said grinder means.

22. A grinding device for automatically grinding saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, said grinding means being adapted to shift from a position where it is remote to the saw blade to a grinding psoition where it will be in operative contact with the saw blade, advancing means carried by the base means and being operatively connected to said blade-holding means for rotating said saw blade after each operative contact between the saw blade and grinding means, first control means operatively connected to said grinding means for moving said grinding means to the grinding position, second control means for returning said grinding means to its initial position, and third control means operatively connected to said first and second control means and said indexing means for actuating said indexing means when said grinding means is being returned to its initial position.

23. A grinding device for automatically grinding saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, said grinding means being adapted to shift from a position where it is remote to the saw blade to a grinding position where it will be in operative contact with the saw blade, advancing means carried by the base means and being operatively connected to said blade-holding means for rotating said saw blade after each operative contact between the saw blade and grinding means, and first control means operatively connected to said grinding means for moving said grinding means to the grinding position.

24. A grinding device for automatically grinding saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, said grinding means being adapted to shift from a position where it is remote to the saw blade to a grinding position where it will be in operative contact with the saw blade, advancing means carried by the base means and being operatively connected to said blade-holding means for rotating said saw blade after each operative contact between the saw blade and grinding means, first control means operatively connected to said grinding means for moving said grinding means to the grinding position, and second control means for returning said grinding means to its initial position.

25. A grinding device for automatically grinding saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, said grinding means being adapted to shift from a position where it is remote to the saw blade to a grinding position where it will be inoperative contact with the saw blade, advancing means carried by the base means and being operatively connected to said blade-holding means for rotating said saw blade after each operative contact between the saw blade and grinding means, first control means operatively connected to said grinding means for moving said grinding means to the grinding position, second control means for returning said grinding means to its initial position, and third control means operatively connected to said first and second control means and said advancing means for actuating said advancing means when said grinding means is being returned to its initial position.

26. A grinding device for automatically grinding saw blades and the like, said device comprising base means, first and second support elements located on said base means in spaced relation so as to define a grinding zone therebetween, slide-forming means operatively mounted on the first support element for shiftable movement toward and away from said grinding zone, power-actuated means for shifting the slide-forming means toward and away from the grinding zone, grinding means operatively mounted on said slide-forming means, blade-holding means operatively mounted on the second support element for positional adjustment with respect to the grinding zone, means interposed between the blade-holding means and the second support element for effecting said positional adjustment with respect to said grinding zone, indexing means operatively mounted on said base means and being operatively located proximate to said grinding zone for positioning each tooth of a saw blade with respect to the grinding zone so that the grinding means can be brought into contact with the saw blade, said grinding means being adapted to shift from a position where it is remote to the saw blade to a grinding position where it will be in operative contact with the saw blade, advancing means carried by the base means and being operatively connected to said blade-holding means for rotating said saw blade after each operative contact between the saw blade and grinding means, first control means operatively connected to said grinding means for moving said grinding means to the grinding position, second control means for returning said grinding means to its initial position, third control means operatively connected to said first and second control means and said advancing means for actuating said advancing means when said grinding means is being returned to its initial position, and fourth control means operatively connected to said first, second, and third control means and said indexing means for actuating said indexing means when said advancing means is actuated.

References Cited by the Examiner

UNITED STATES PATENTS

| | | | |
|---|---|---|---|
| 315,715 | 4/1885 | Bush | 76—43 |
| 360,679 | 4/1887 | Gaskin | 76—43 |
| 579,837 | 3/1897 | Parsons | 76—43 |
| 908,304 | 12/1908 | Miner | 76—41 |
| 1,768,996 | 7/1930 | Ransom | 76—43 |
| 2,155,809 | 4/1939 | Thurston | 76—41 |
| 2,379,642 | 7/1945 | Kieche | 76—41 |

GRANVILLE Y. CUSTER, Jr., *Primary Examiner.*

H. J. GROSS, *Assistant Examiner.*